United States Patent
Guillemette

(12) 
(10) Patent No.: US 9,212,830 B2
(45) Date of Patent: Dec. 15, 2015

(54) METHOD AND SYSTEM FOR OPTIMIZING AND PROTECTING SOLAR PANELS

(76) Inventor: Pascal Guillemette, St-Jean-Chrysostome (CA)

( * ) Notice: Subject to any disclaimer, the term of this patent is extended or adjusted under 35 U.S.C. 154(b) by 300 days.

(21) Appl. No.: 13/254,293

(22) PCT Filed: Mar. 2, 2010

(86) PCT No.: PCT/CA2010/000253
§ 371 (c)(1),
(2), (4) Date: Sep. 1, 2011

(87) PCT Pub. No.: WO2010/099596
PCT Pub. Date: Sep. 10, 2010

(65) Prior Publication Data
US 2011/0308575 A1    Dec. 22, 2011

Related U.S. Application Data

(60) Provisional application No. 61/157,714, filed on Mar. 5, 2009.

(51) Int. Cl.
*F24J 2/54*    (2006.01)
*H02S 20/32*    (2014.01)
(Continued)

(52) U.S. Cl.
CPC .... *F24J 2/38* (2013.01); *B60P 3/36* (2013.01); *F21S 8/086* (2013.01); *F21S 9/032* (2013.01);
(Continued)

(58) Field of Classification Search
CPC . G01S 3/7861; H01L 31/042; H01L 31/0422; H01L 31/0424; H01L 31/045; H01L 31/0482; Y02E 10/47; F24J 2/52; F24J 2/38; F24J 2/5201; F24J 2/54; F24J 2/5417; F24J 2/542; F24J 2/5424; F24J 2/5427; F24J 2/5431

USPC .......... 136/243–265; 250/203.4; 29/890.033; 126/600, 601, 607, 621, 624, 627
See application file for complete search history.

(56) References Cited

U.S. PATENT DOCUMENTS 3,698,958 A    10/1972    Williamson et al.
3,781,647 A  * 12/1973    Glaser ........................... 322/2 R
(Continued)

FOREIGN PATENT DOCUMENTS

DE    3731418 A1    6/1989
EP    0195 554    3/1986
(Continued)

OTHER PUBLICATIONS
Machine translation of DE3731418.*
(Continued)

*Primary Examiner* — Jeffrey T Barton
*Assistant Examiner* — Eric R Smith
(74) *Attorney, Agent, or Firm* — Goudreau Gage Dubuc; Gwendoline Bruneau

(57) ABSTRACT

A system and a method for optimizing and protecting solar panels, the system comprising a driving unit, a solar panel connected to the driving unit, a micro-controller controlling movements of the driving unit, a sun tracking unit sending data about the position of the sun to the micro-controller; and a shelter receiving the solar panel when the solar under control of the microcontroller. The method comprises connecting a solar panel to a driving unit connected to a microcontroller; connecting the microcontroller to a sun tracking unit sending data about the position of the sun to the microcontroller; providing a shelter; and monitoring, by the microcontroller, the driving unit into orienting the solar panel in relation to the position of the sun by rotation about at least one axis and into moving the solar panel from a deployed operating position to a sheltered non operating position into the shelter.

11 Claims, 32 Drawing Sheets

(51) Int. Cl.

| | | |
|---|---|---|
| *F24J 2/38* | (2014.01) | |
| *B60P 3/36* | (2006.01) | |
| *F21S 8/08* | (2006.01) | |
| *F21S 9/03* | (2006.01) | |
| *F24J 2/46* | (2006.01) | |
| *F24J 2/52* | (2006.01) | |
| *G09F 13/02* | (2006.01) | |
| *F21W 131/103* | (2006.01) | |
| *F24J 2/04* | (2006.01) | |

(52) U.S. Cl.
CPC ............. *F24J 2/4609* (2013.01); *F24J 2/5266* (2013.01); *F24J 2/5403* (2013.01); *F24J 2/5417* (2013.01); *G09F 13/02* (2013.01); *H02S 20/32* (2014.12); *F21W 2131/103* (2013.01); *F24J 2/045* (2013.01); *F24J 2/0433* (2013.01); *F24J 2/0444* (2013.01); *Y02B 10/10* (2013.01); *Y02B 10/20* (2013.01); *Y02E 10/47* (2013.01)

(56) References Cited

U.S. PATENT DOCUMENTS

| | | | | |
|---|---|---|---|---|
| 3,841,302 | A | | 10/1974 | Falbel |
| 4,015,653 | A | * | 4/1977 | Slysh et al. .................. 160/213 |
| 4,262,195 | A | * | 4/1981 | White et al. ............... 250/203.4 |
| 4,307,711 | A | * | 12/1981 | Doundoulakis ............... 126/677 |
| 4,324,947 | A | | 4/1982 | Dumbeck |
| 4,421,943 | A | | 12/1983 | Withjack |
| 4,452,234 | A | | 6/1984 | Withjack |
| 4,636,579 | A | | 1/1987 | Hanak et al. |
| 4,722,325 | A | | 2/1988 | Fulkerson |
| 5,228,644 | A | * | 7/1993 | Garriott et al. ............. 244/172.6 |
| 5,333,602 | A | | 8/1994 | Huang |
| 5,433,259 | A | | 7/1995 | Faludy |
| 5,517,358 | A | | 5/1996 | Dominguez |
| 5,905,356 | A | * | 5/1999 | Wells .............................. 320/101 |
| 6,555,740 | B2 | * | 4/2003 | Roth et al. ..................... 136/245 |
| 6,581,883 | B2 | | 6/2003 | McGee et al. |
| 6,606,823 | B1 | | 8/2003 | McDonough et al. |
| 2004/0000334 | A1 | | 1/2004 | Ressler |
| 2005/0161073 | A1 | * | 7/2005 | Head et al. ..................... 136/245 |
| 2006/0162772 | A1 | * | 7/2006 | Presher et al. ................. 136/290 |
| 2007/0074463 | A1 | | 4/2007 | Ziegelman |
| 2007/0215199 | A1 | * | 9/2007 | Dold et al. ..................... 136/246 |
| 2007/0277867 | A1 | | 12/2007 | Heidenreich |
| 2008/0190476 | A1 | * | 8/2008 | Baruh ............................ 136/245 |
| 2008/0196758 | A1 | * | 8/2008 | McGuire ....................... 136/245 |
| 2010/0000592 | A1 | * | 1/2010 | Ko ................................ 136/246 |
| 2010/0071684 | A1 | * | 3/2010 | Cowan et al. ................. 126/605 |
| 2010/0141424 | A1 | * | 6/2010 | Coloma Calahorra et al. ......................... 340/539.1 |
| 2010/0206354 | A1 | * | 8/2010 | Greene et al. ................. 136/245 |
| 2011/0047891 | A1 | * | 3/2011 | Andretich ....................... 52/79.5 |

FOREIGN PATENT DOCUMENTS

| | | | | |
|---|---|---|---|---|
| FR | 2535033 | A | * | 4/1984 |
| FR | 2614368 | A | * | 10/1988 |
| JP | 08-014885 | A | | 1/1996 |
| JP | 2002-026357 | A | | 1/2002 |
| JP | 2005-5296 | A | | 1/2005 |
| JP | 2006-060180 | A | | 3/2006 |
| JP | 3138252 | | | 12/2007 |
| JP | 2008-270698 | A | | 11/2008 |
| JP | 3149026 | | | 3/2009 |
| WO | WO 2008062076 | A1 | * | 5/2008 |
| WO | 2008098051 | | | 8/2008 |

OTHER PUBLICATIONS

Machine translation of FR 2535033 A.*
Machine translation of FR2614368A.*

* cited by examiner

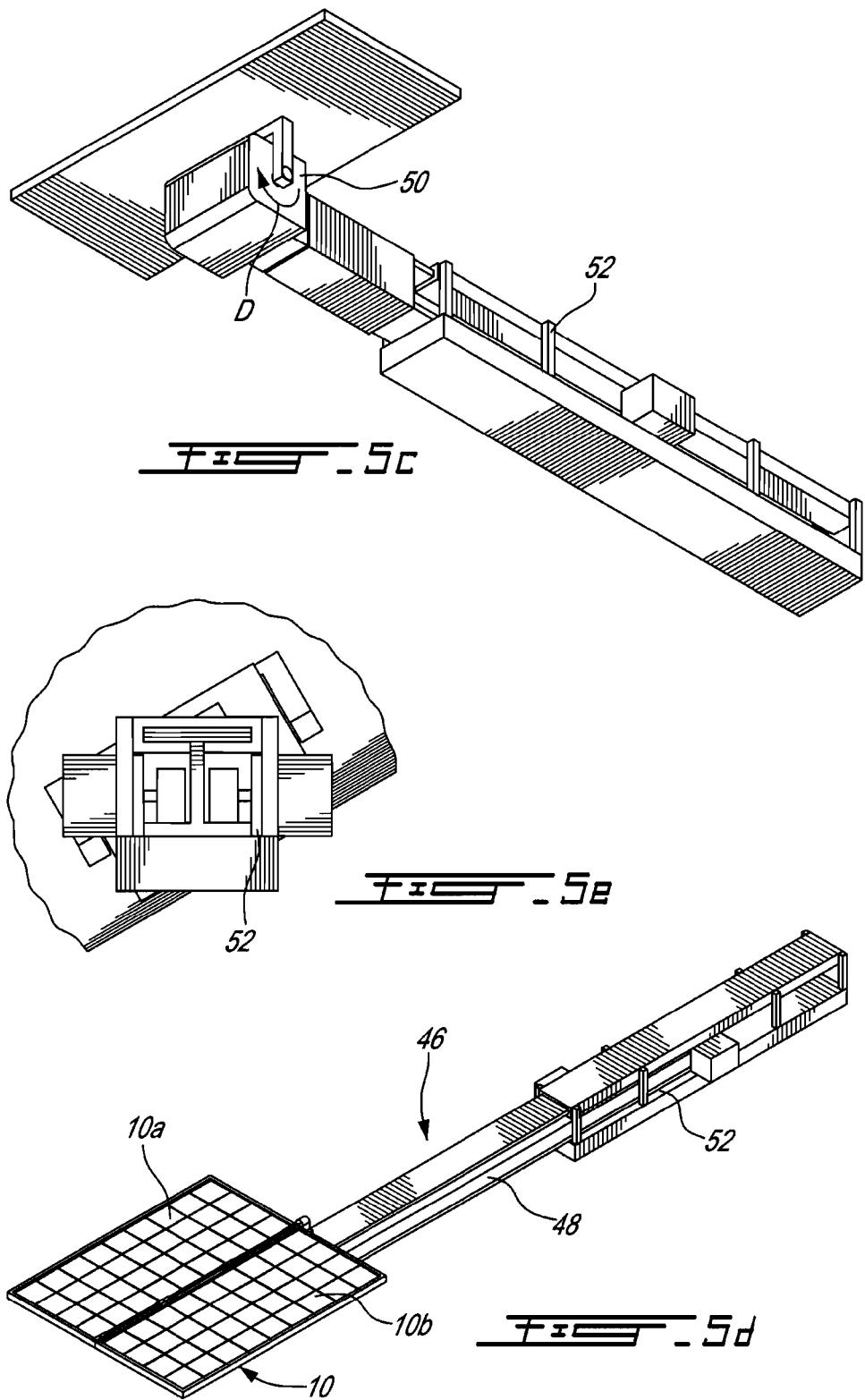

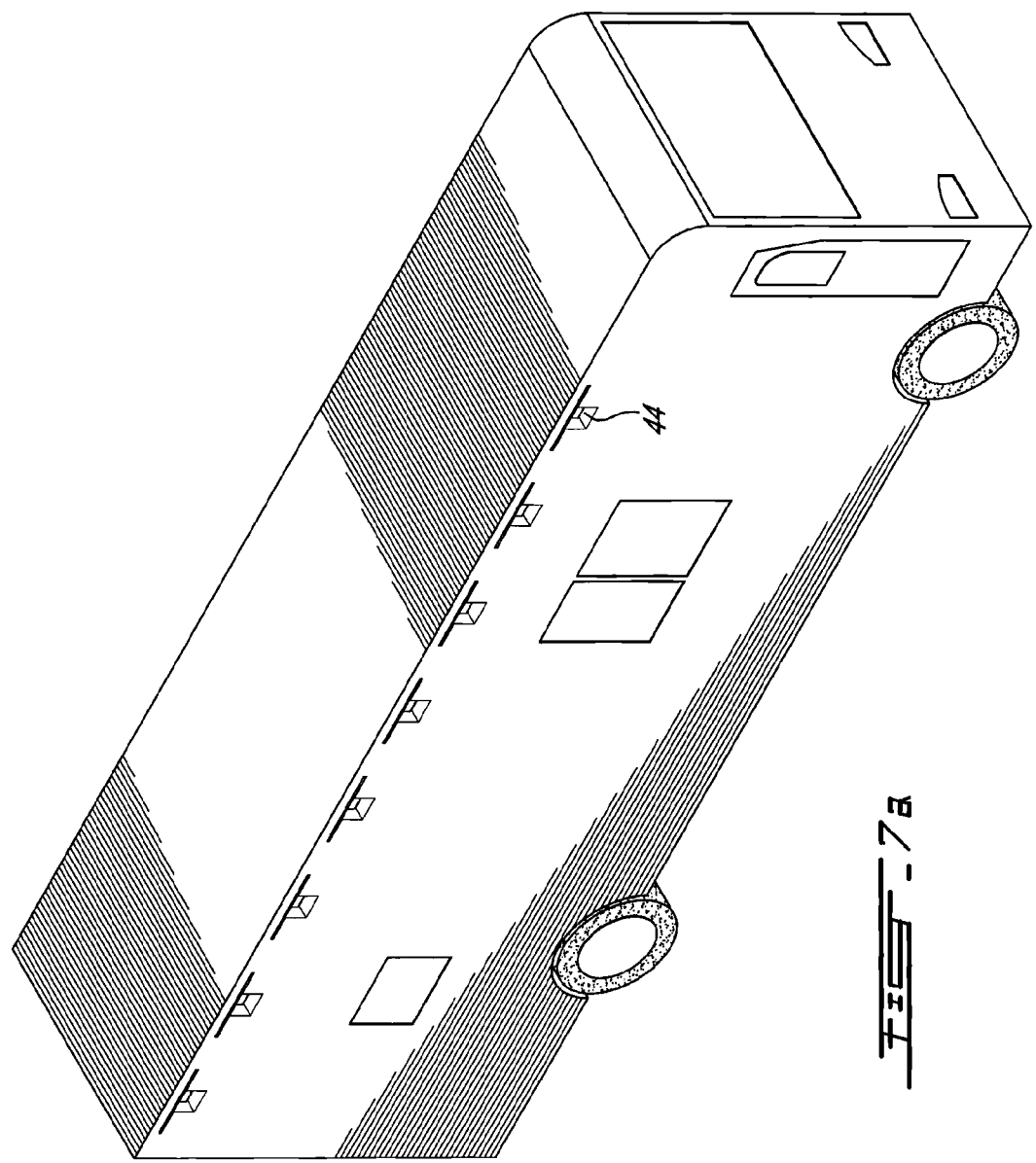

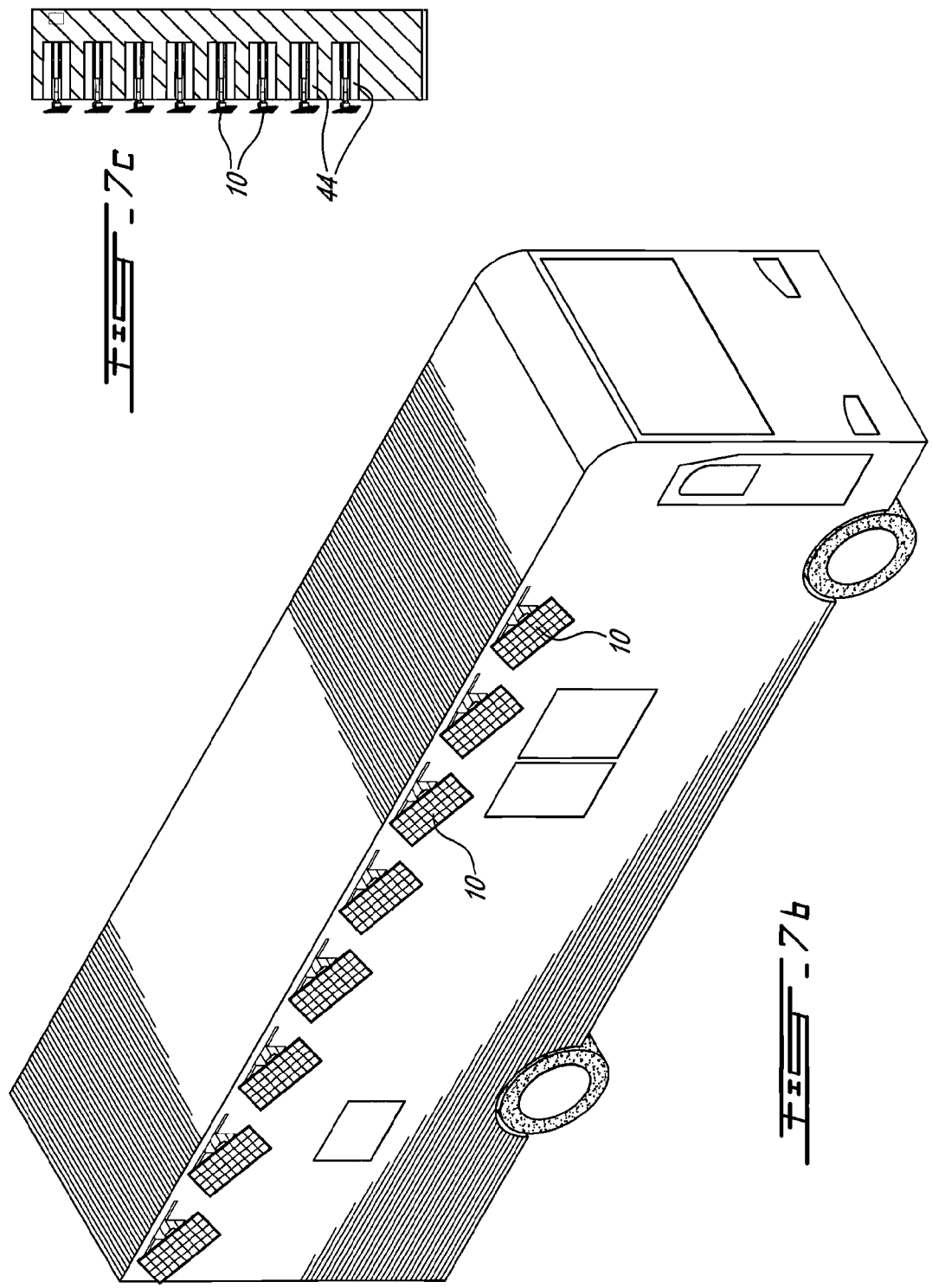

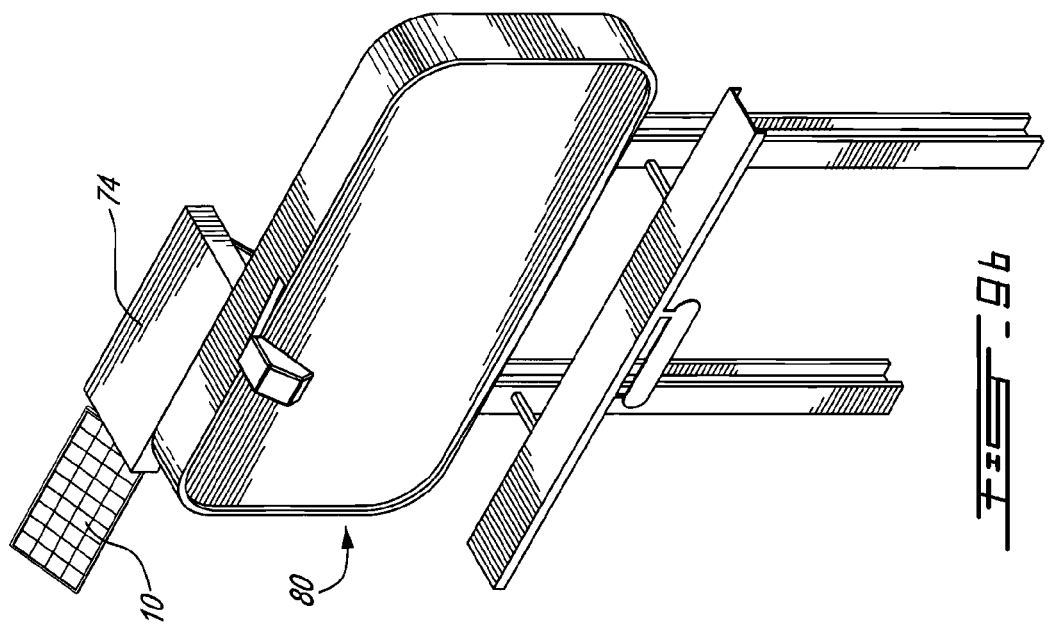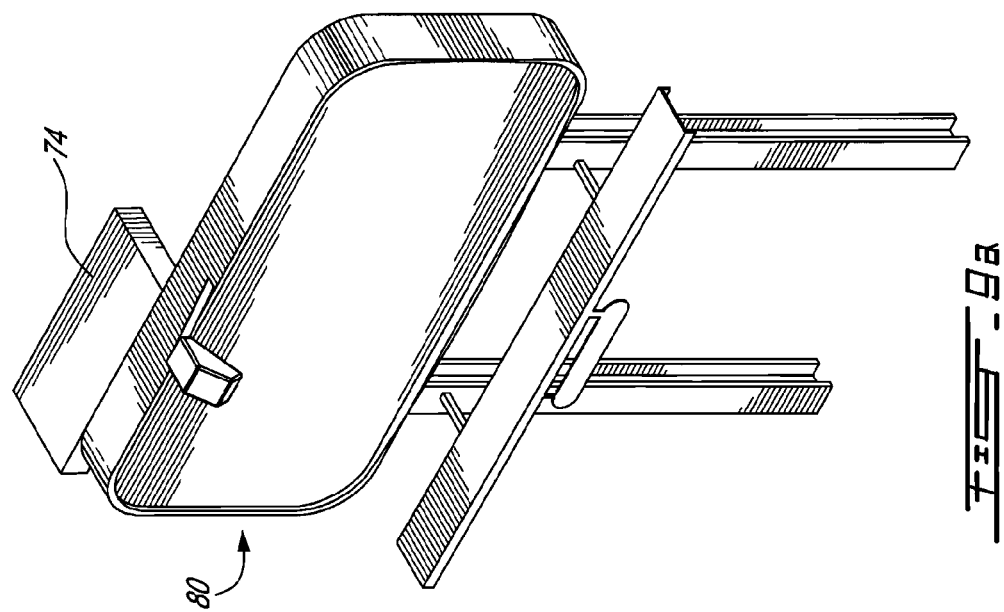

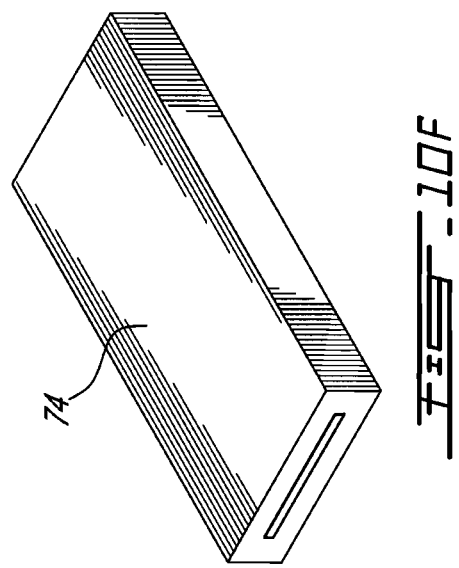
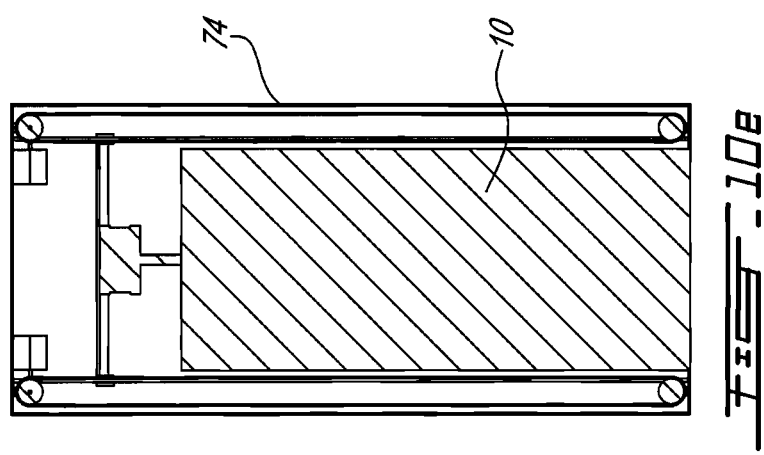
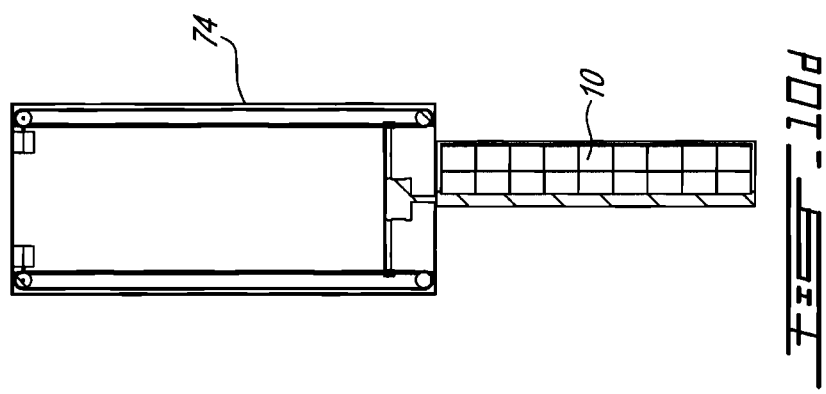

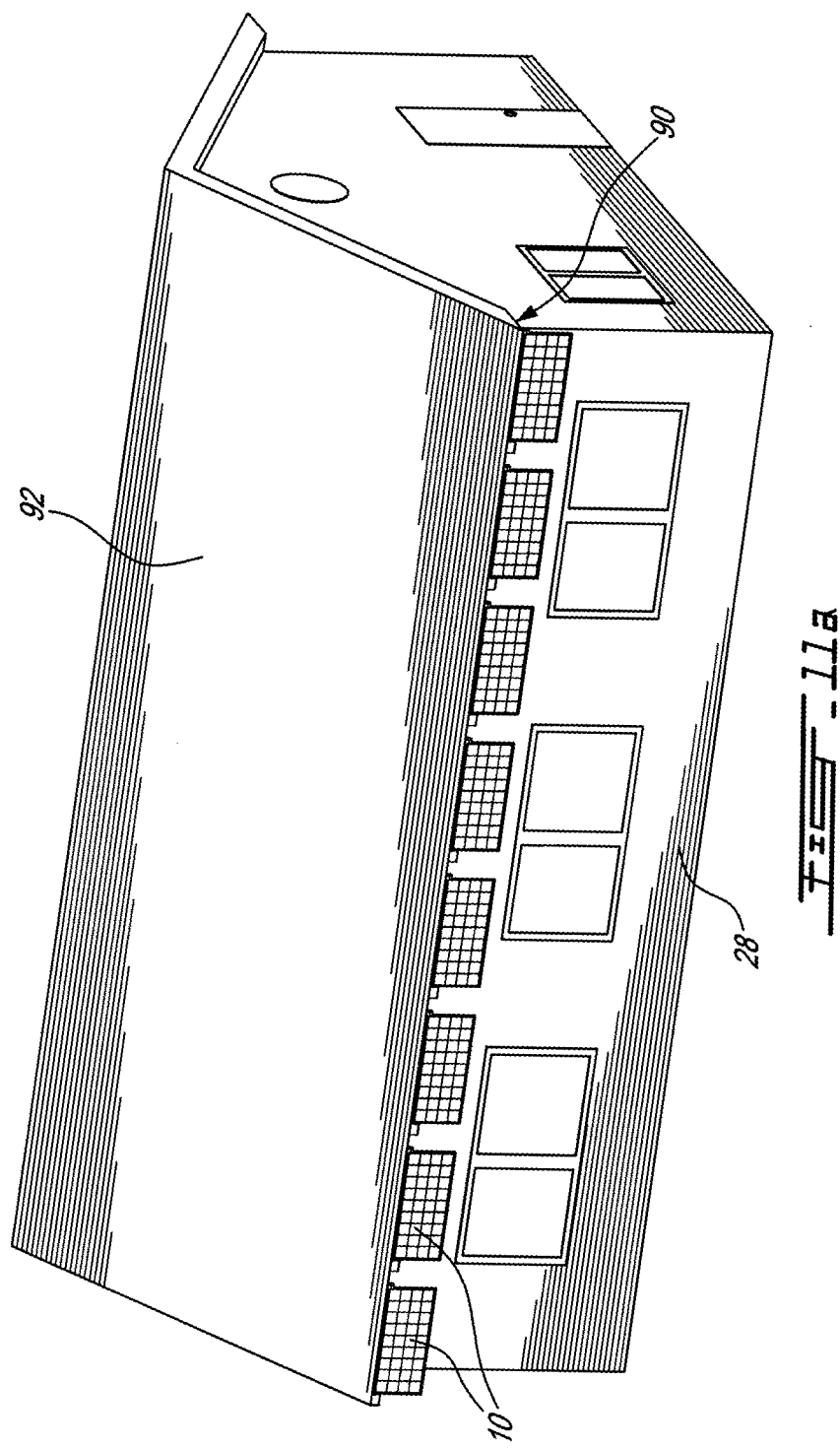

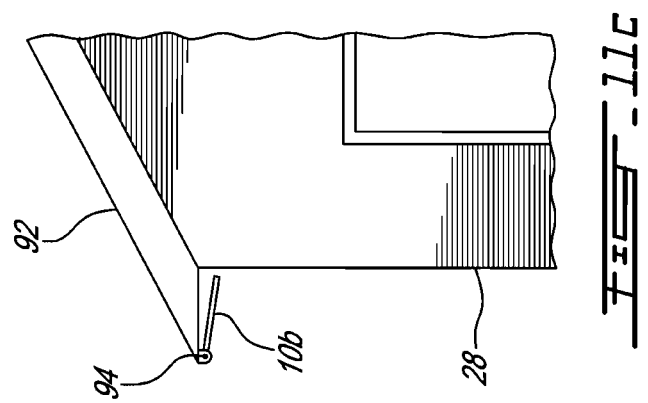
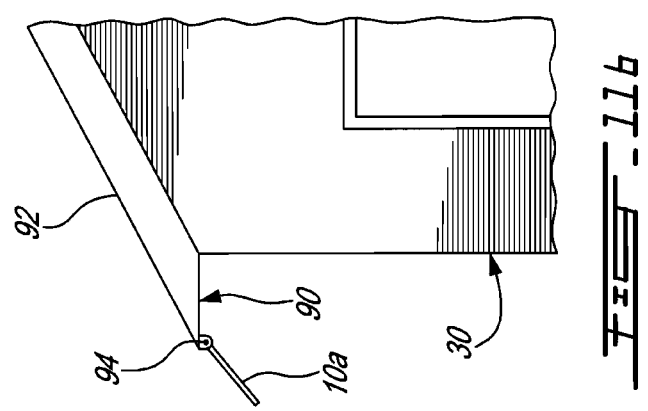

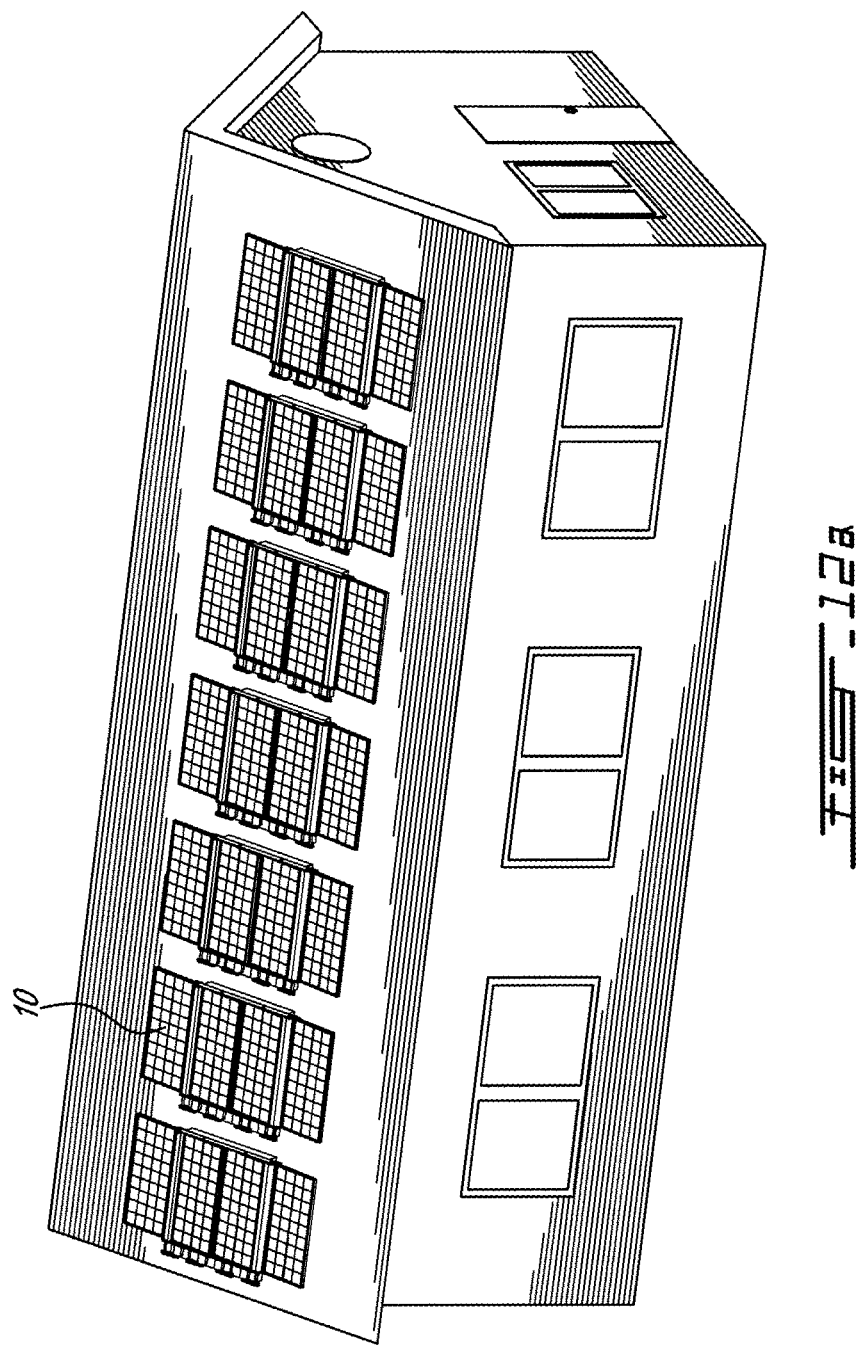

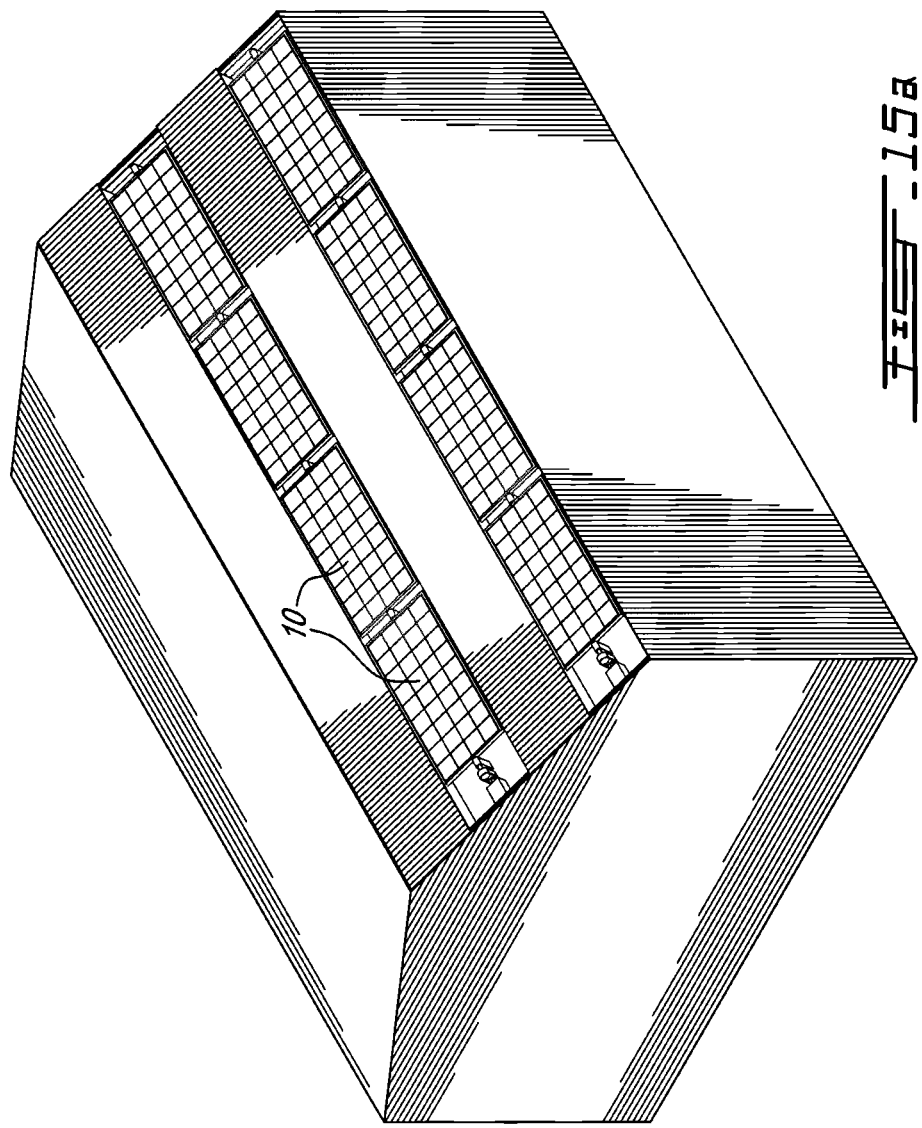

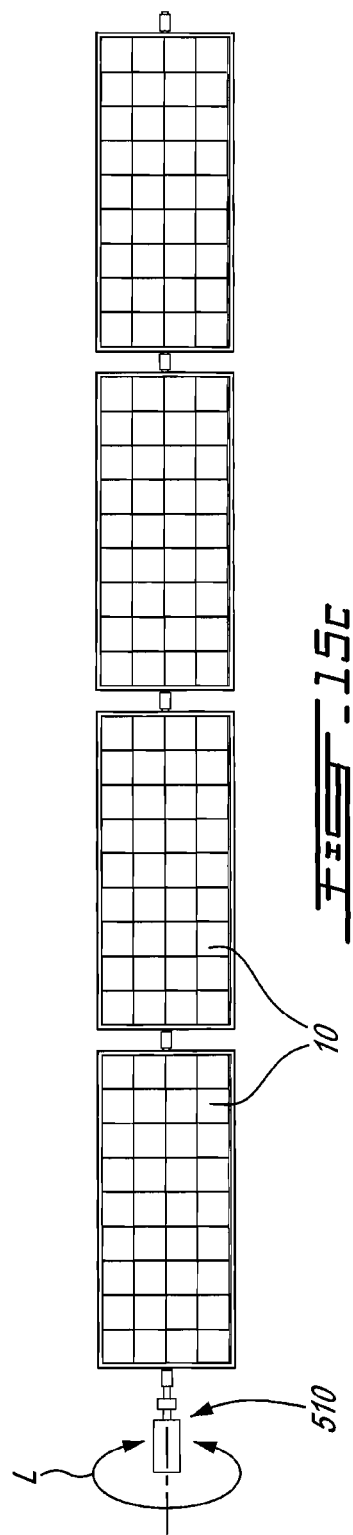

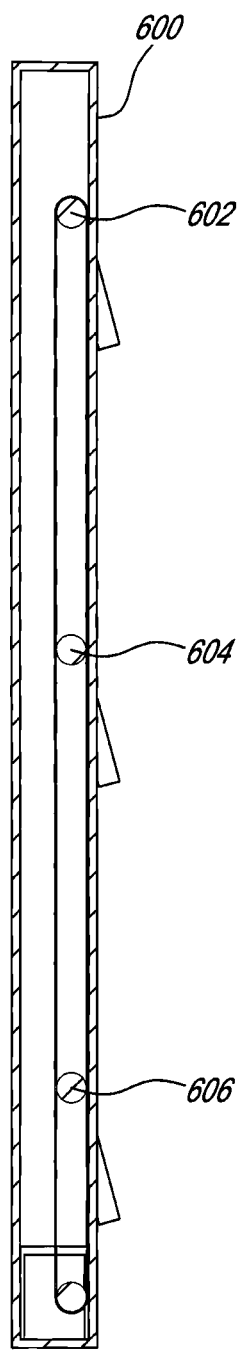

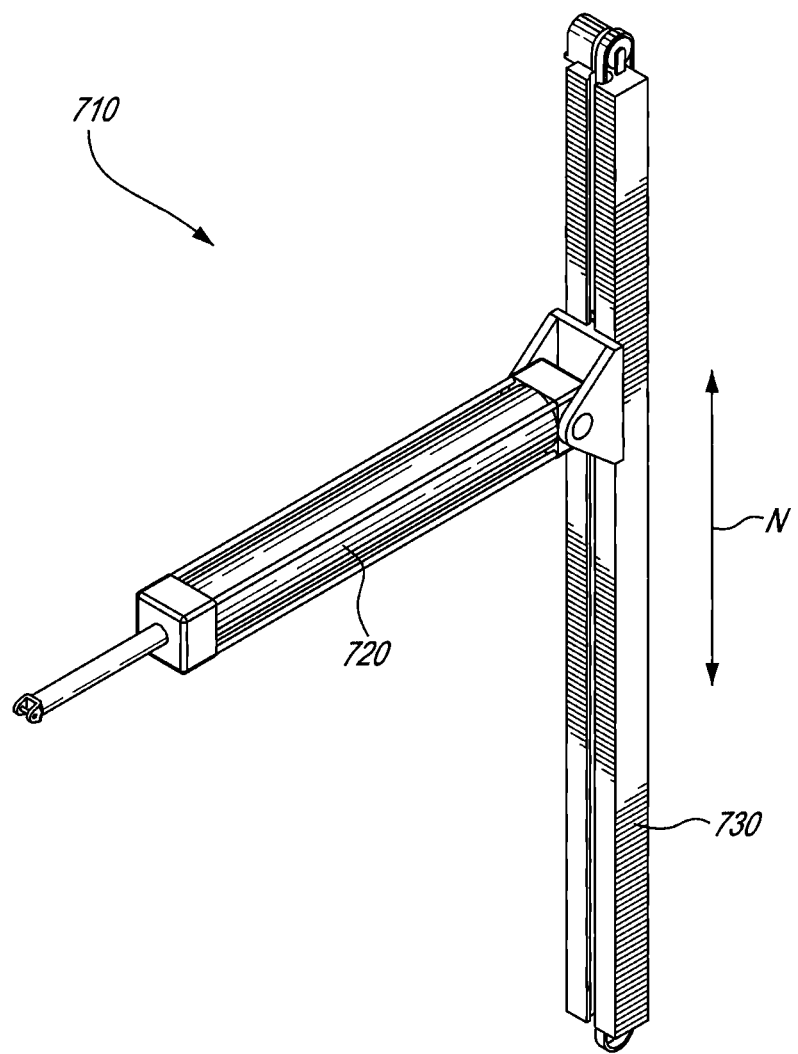

METHOD AND SYSTEM FOR OPTIMIZING AND PROTECTING SOLAR PANELS

CROSS-REFERENCE TO RELATED APPLICATIONS

This application is a National Entry Application of PCT application no CA2010/000253 filed on Mar. 2, 2010 and published in English under PCT Article 21(2), which itself claims benefit of U.S. provisional application Ser. No. 61/157,714, filed on Mar. 5, 2009. All documents above are incorporated herein in their entirety by reference.

FIELD OF THE INVENTION

The present invention relates to solar panels. More specifically, the present invention is concerned with a method and a system for optimizing and protecting solar panels.

SUMMARY OF THE INVENTION

There is provided a system, comprising a driving unit; a solar panel connected to the driving unit; a microcontroller controlling movements of the driving unit; a sun tracking unit sending data about the position of the sun to the microcontroller; and a shelter, receiving the solar panel when the solar panel is withdrawn from an exposed position, by action of the driving unit.

There is further provided a method for optimizing a solar panel, comprising connecting a solar panel to a driving unit; connecting the driving unit to a microcontroller; connecting the microcontroller to a sun tracking unit sending data about the position of the sun to the microcontroller; providing a shelter; and monitoring, by the microcontroller, the driving unit into orienting the solar panel in relation to the position of the sun by rotation about at least one axis and into moving the solar panel from a deployed operating position to a sheltered non operating position into the shelter.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7 show a further embodiment of the system of the present invention;

FIG. 9 show a further embodiment of the system of the present invention;

DESCRIPTION OF EMBODIMENTS OF THE INVENTION

There is generally provided a system for optimizing and protecting solar panels from the environment.

Figure 1:
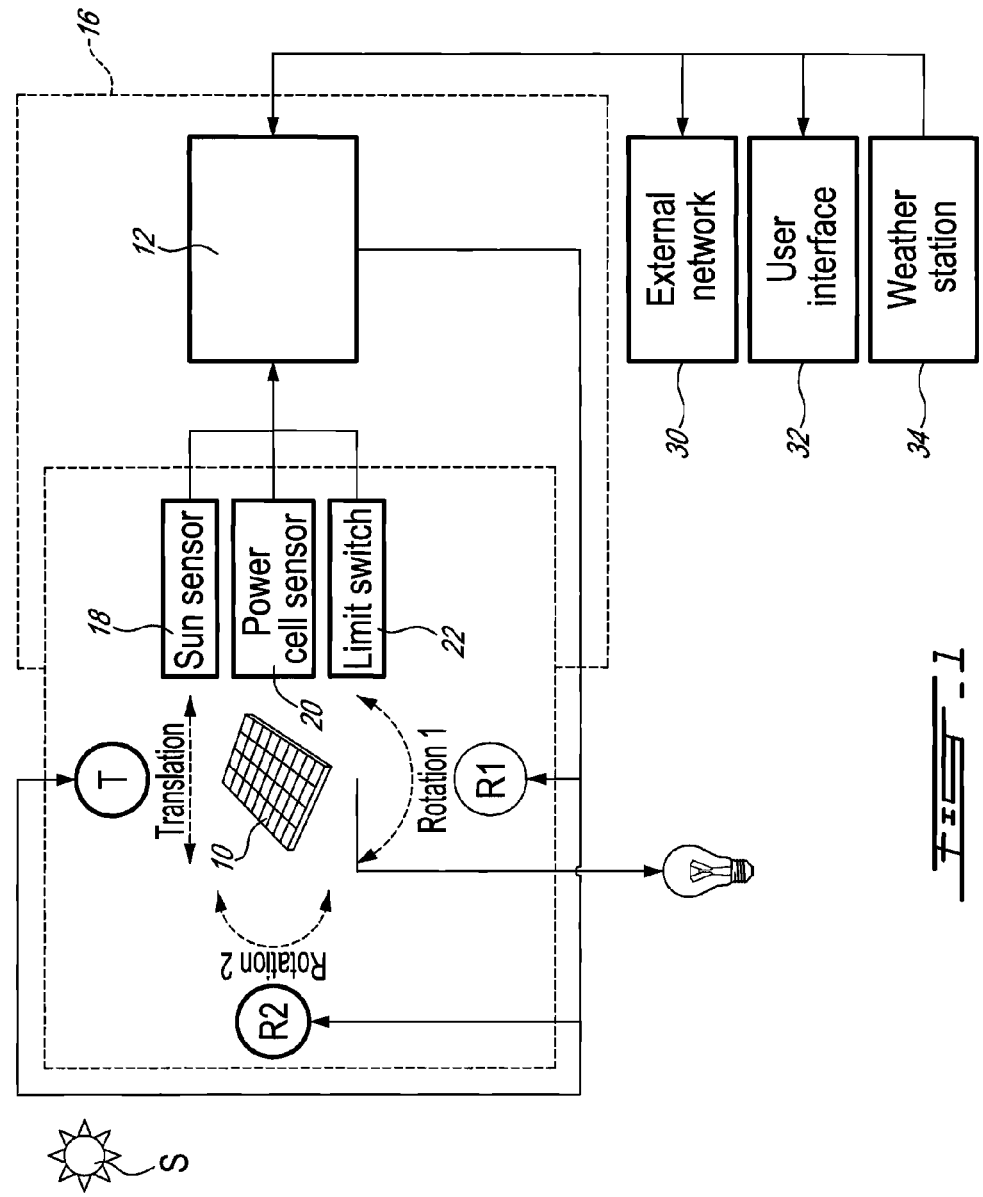
FIG. 1 is a general view of a system according to an embodiment of an aspect of the present invention.

As shown in FIG. 1, the present system generally comprises a solar panel 10 and a microcontroller 12. The microcontroller 12 monitors orientation of the solar panel 10 in relation to the sun (S), by rotation about one or two axis (see rotation 1 and rotation 2 in FIG. 1), and movement of the solar panel (see translation in FIG. 1) from a deployed operating position to a sheltered non operating position into a shelter 16. Each axis may be driven using a motorization and/or power unit. In its operating position, the solar panel 10 receives energy from the sun (S) and the microcontroller 12 drives motors R1 and/or motor R2 to control the orientation of the solar panel 10 about axis of rotation 1 and/or axis of rotation 2 respectively, out of the shelter 16. The microcontroller 12 also controls the translation movement of the panel (see translation in FIG. 1) from its operating position outside of the shelter 16 to the shielded position inside the shelter 16 whenever damaging conditions are detected for example, as will be explained below, by controlling a motor T.

The microcontroller 12 may receive data for tracking the position of the sun from photoresistive cells/phototransistors or differential sensors 18 for example. The microcontroller 12 may also receive data from sensors 20 measuring the power of the cells of the panel 10, and be programmed to stop operation of the panel 10, by withdrawal of the panel 10 into its non operating position in the shelter 16 for example, under a threshold of measured power indicating that the panel 10 is at risk of being critically damaged if further used. A further sensor 22, such as a limit switch, may be used to indicate the extent of motion of the panel 10 out of the shelter 16, up to a maximum run.

The microcontroller 12 may be connected to an external network 30 and/or to a user interface 32. Moreover, the microcontroller 12 may be connected to a weather station 34, i.e. a set of sensors such as barometers, photoresistive cells/phototransistors, anenometers etc.

The external network 30 may be a phone or cable network or any communication system.

The user interface 32 allows a user to configure the system and to monitor the state of the system. The system may also be provided with a software for automated control thereof. The system may be self sufficient, by using photoresistive cells/ phototransistors 18 determining the position of the sun for example. The system may further be connected to an alarm system.

Tracking of the sun (S) is performed by the sensors 18. However, since conditions may not allow a precise direct tracking by sensors, for example in cases of cloudy skies, additional tracking tools are provided, through equations and the external network 30. Indeed, the position of the sun relative to a location on earth may be predicted using known equations (F. C. McQuiston, J. D. Parker, J. D. Spitler, Heating, Ventilating, and Air Conditioning, Analysis and Design, Wiley, 6th Edition, 2005. Référence web: http://aa.usno.navy.mil/data/docs/RS_OneDay.php). Thus, knowing the location of the system and the time, the position where the sun should be can be computed. Comparison of these different sources of data about the position of the sun (S) allow a precise positioning of the sun, and therefore an optimised orientation of the panel 10 and an optimised performance thereof at all times.

Beside this sun tracking optimization, the present system allows effective protection of the panel 10, by monitoring the power yield of the panel 10 as mentioned before (through sensors 20), by connection to the external network 30 for notices of precipitations or any imminent adverse conditions, and to the weather station 34 for example. The panel 10 may also be manually moved from its operating position to a non operating position. The shelter 16 allows the panel 10 to be stored whenever wished, for example to prevent thief thereof.

Conditions prompting withdrawal of the panel 10 from its operating position to a non operating position can include adverse forecasted meteorological conditions received by the microcontroller 12 from the weather station 34 and/or the external network 30 and detected values related to failure of cells of the solar panel from sensors 20 located on the surface of the panel 10 as mentioned before for example. A command may further be initiated by a user through the user interface 32, or remotely through the external network 30.

Figure 2:
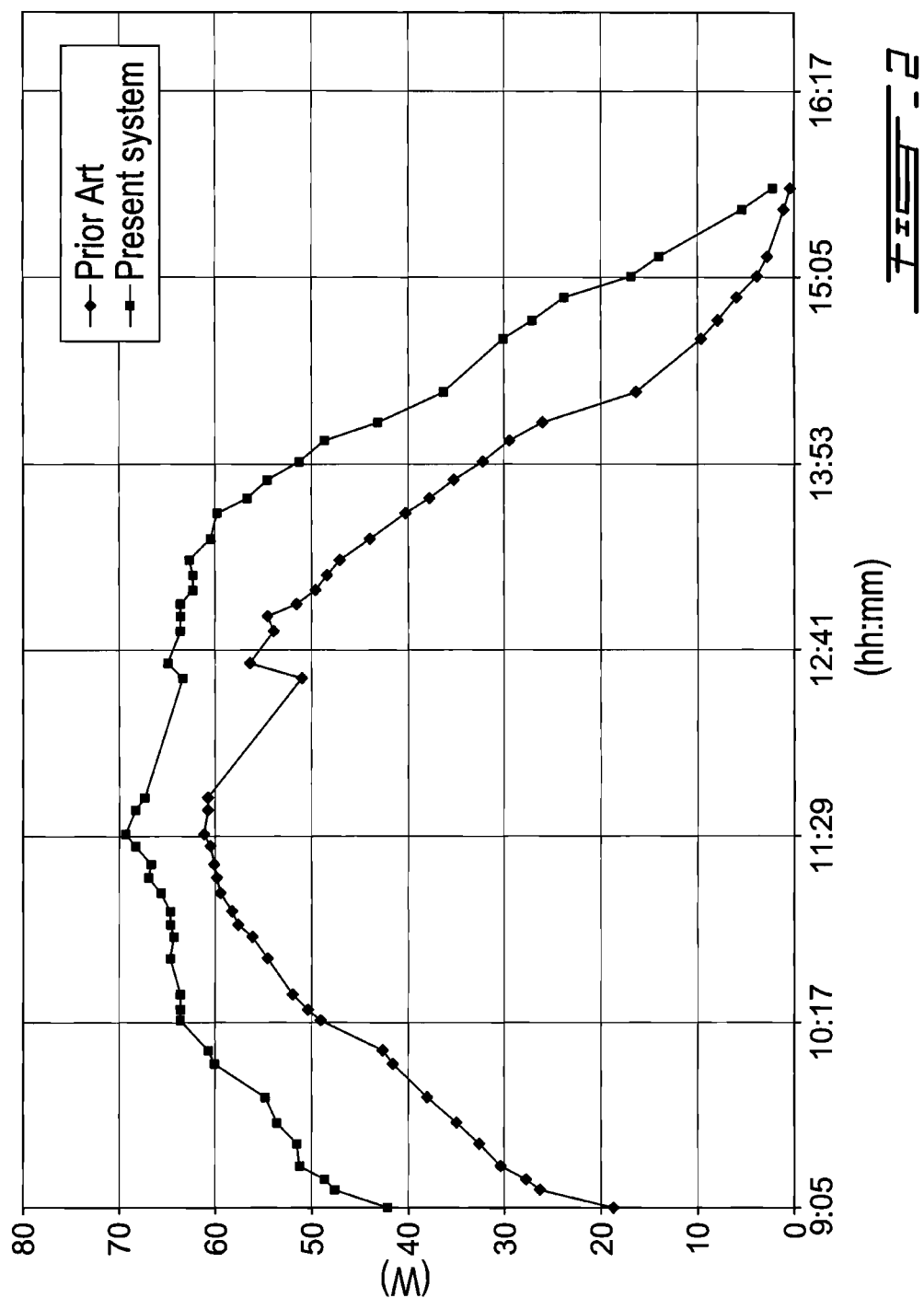
FIG. 2 is a graph of instantaneous power (W) versus time (hh:mm) of a system as known in the art and the system of FIG. 1.

FIG. 2 show results obtained with a system according to an embodiment of the present invention (squares) and those obtained with a system of the prior art (rhomboids), in terms of instantaneous power (W) versus time (hh:mm), during the course of a day, from sunrise to sunset. The system of the prior art used for the comparison comprises a fixed panel oriented towards the south at 45°, which is known as the best configuration for a fixed panel in Québec, where the experiment took place (see for example https://glfc.cfsnet.nfis.org/mapserver/pv/index.php?). As can be clearly seen, the system of present invention (squares) allows a distinct and sustained gain in instantaneous power.

In the following, a number of applications of the present system will be described.

In FIGS. 3-6, the present system is shown in relation to buildings for example.

Figure 3A:
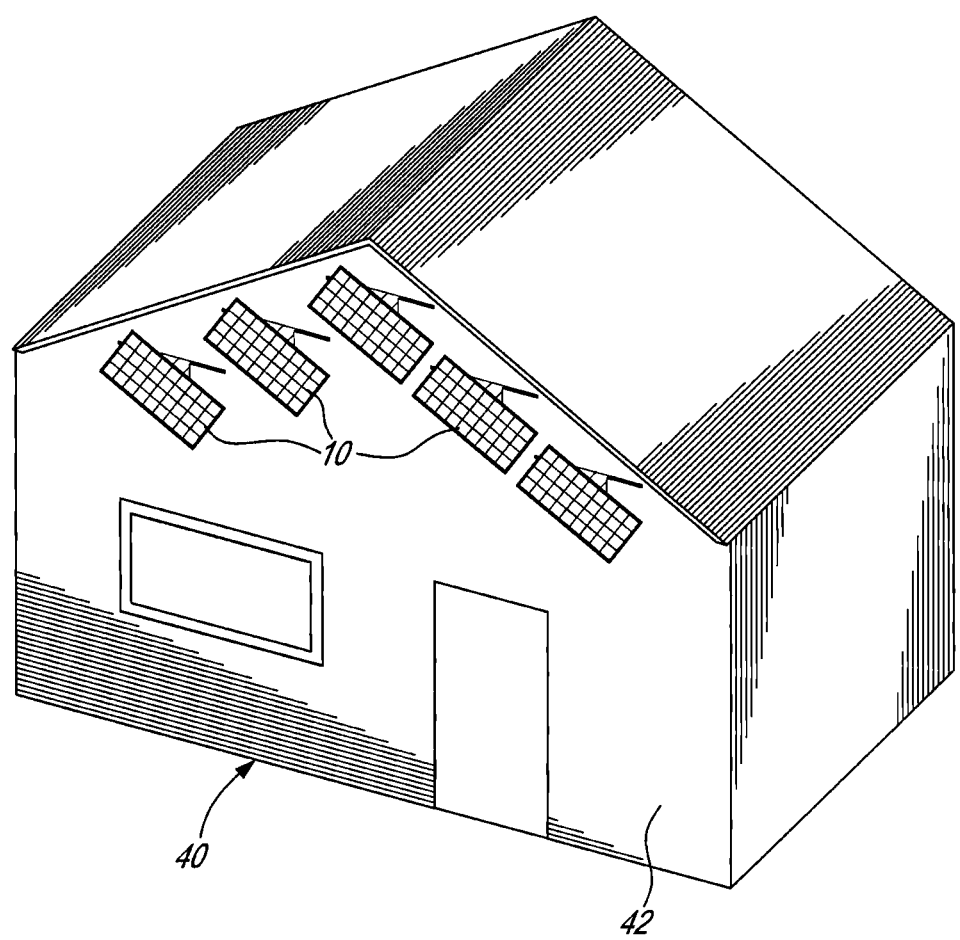
FIGS. 3a and 3b show a system according to an embodiment of the system of FIG. 1, with the solar panels in a working position and in a sheltered position respectively.
Figure 3B:
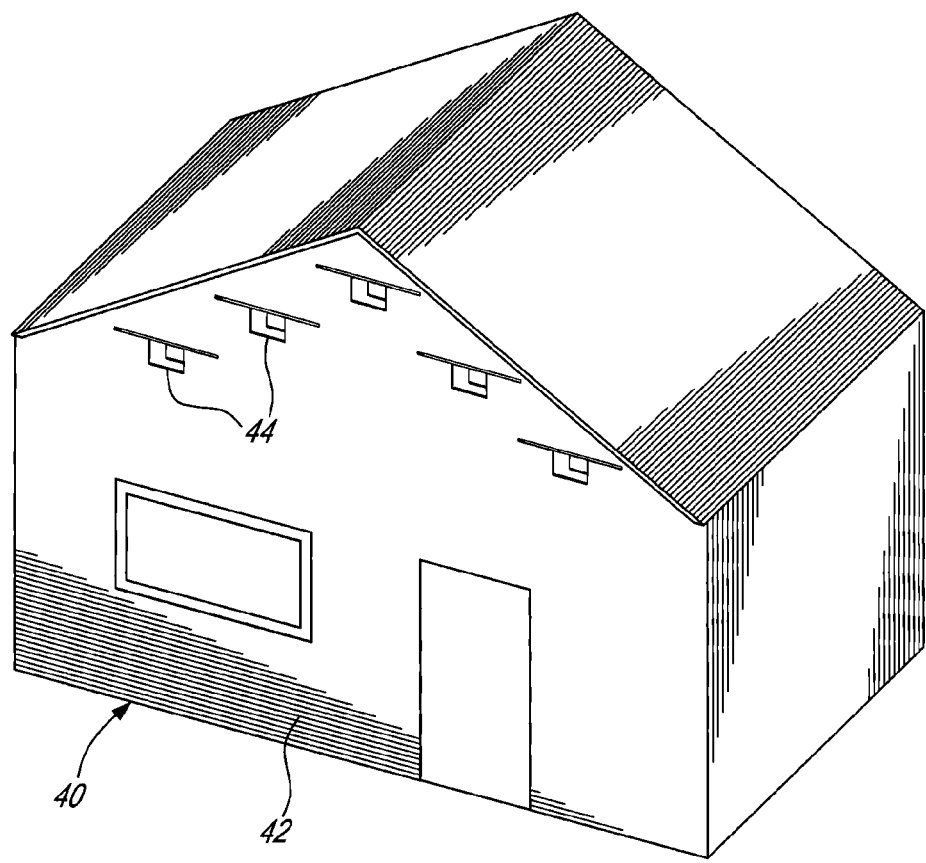
Figure 3C:
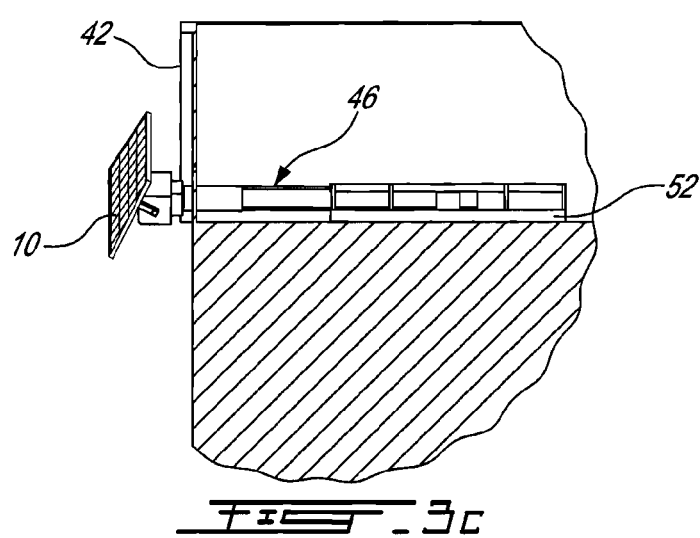
FIG. 3c shows details of the system.
Figure 4A:
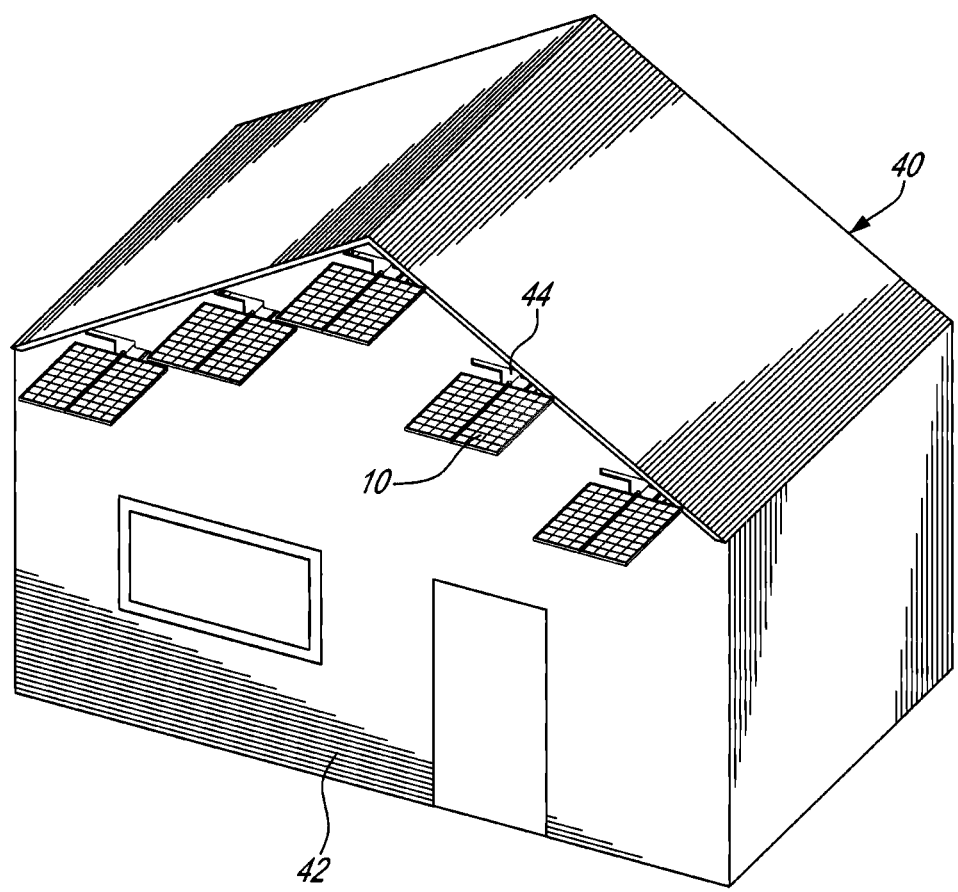
FIGS. 4a and 4b show another embodiment of the system of FIG. 1, with the solar panels in a working position and in a sheltered position respectively.

In FIGS. 3a and 4a, solar panels 10 are shown extending out from the surface of an exterior wall 42 of a building, such as a house 40, out of recesses 44 provided on this wall as seen in FIGS. 3b, 3c, 4a and 4b. As best seen in FIG. 3c, each panel 10 is operated by a driving unit 46 accommodated behind the wall 42.

Figure 4B:
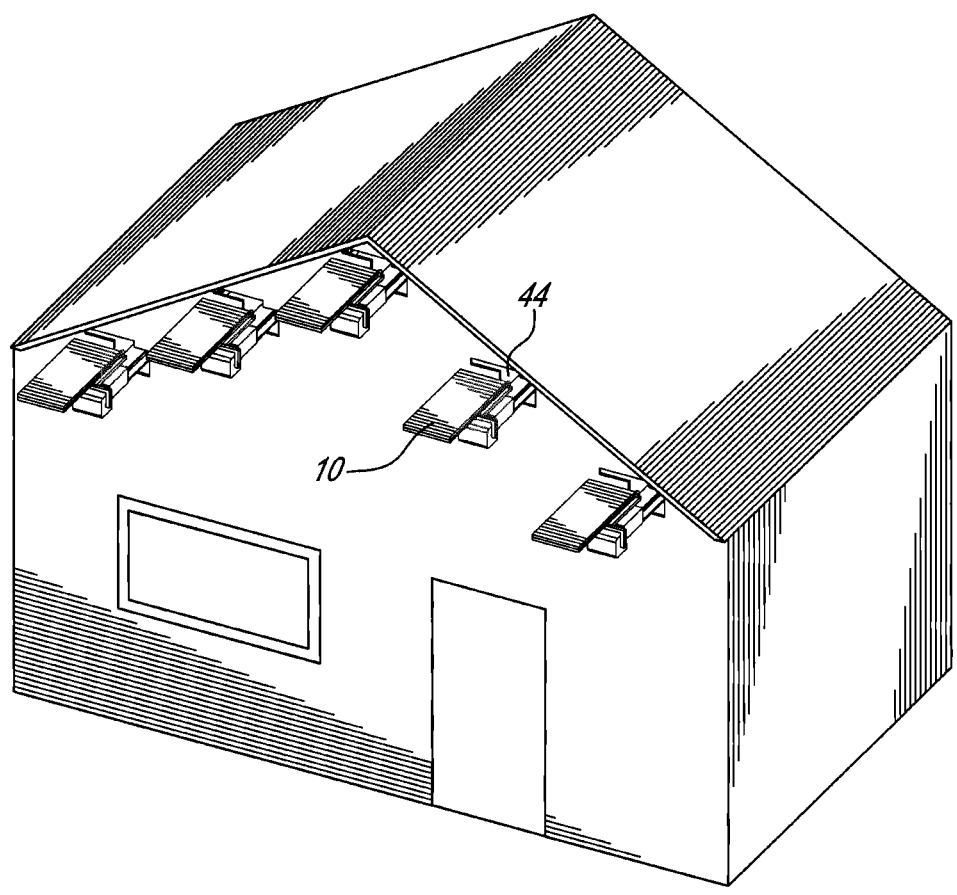
Figure 5A:
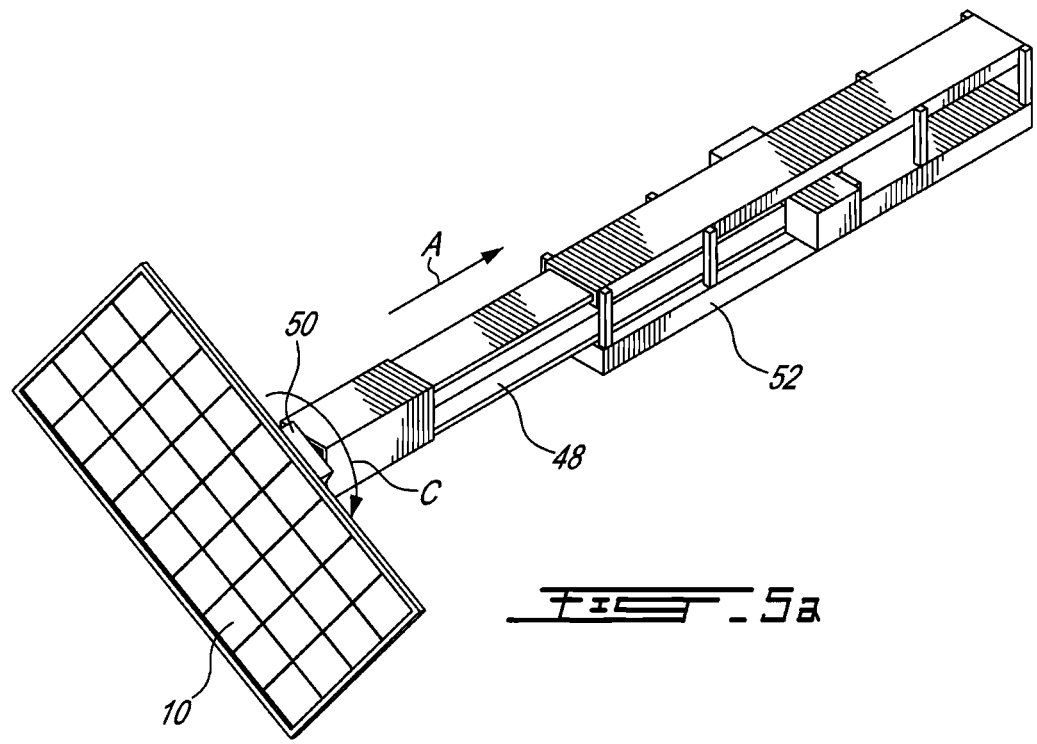
FIG. 5 shows details of a driving unit of the system of FIG. 1.
Figure 5B:
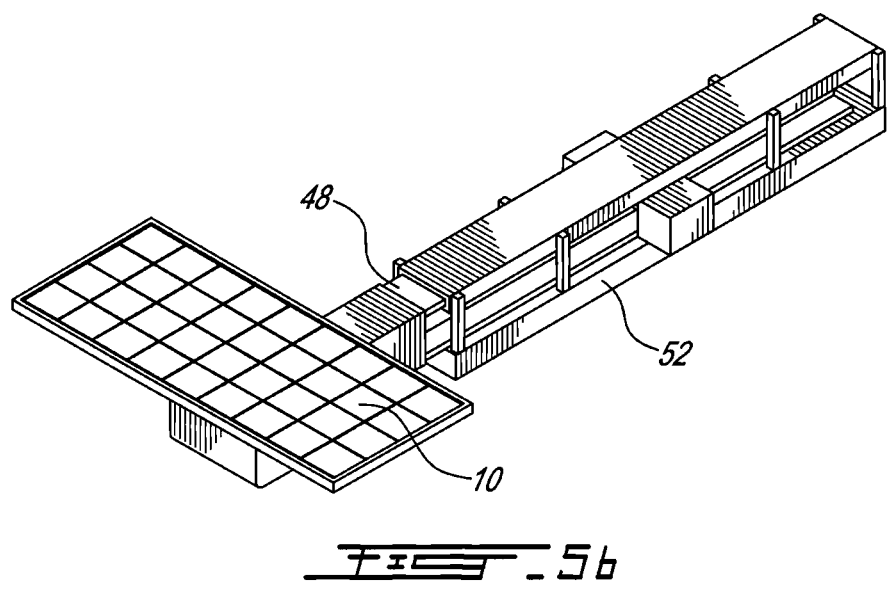

As shown in FIG. 3c and FIG. 5, the driving unit 46 comprises a mobile shaft 48. In FIG. 5a the shaft 48 is seen in an extended position thereof, for supporting the panel 10 in a position away from the wall 42 in FIGS. 3a, 3c, 4a, 4b for example. The shaft 48 may be retracted by translation for example (see arrow A in FIG. 5a) to a retracted position shown in FIG. 5b, for withdrawing the panel 10 in a sheltered position as shown in FIG. 3b for example.

As best seen in FIG. 5, the panel 10 is secured to a free end 50 of the shaft 48, so that the panel 10 can be withdrawn behind the wall 42 through a recess 44, guided on rails 52 for example (see in section in FIG. 5c), when needed, for protection of the panel 10 against the environment.

When the panel 10 is fully retracted behind the wall 42 as in FIG. 3b, the opening 44 in the wall 42 may be closed by a trapdoor (not shown) or the like for example.

The panel 10 may be oriented according to different axis (see arrow C in FIG. 5a and arrow D in FIG. 5c), using motors as described hereinabove, so that the panel may be best oriented according to the sun position in an operating position. The axes can be moved under the action of a range of actuators, such as levers, gears, perpetual screw, tension rods etc, driven by the motors . . . .

The shaft 48 may be a hydraulic, a pneumatic, mechanic or an electric shaft for example, driven by a motor, and guided by rails 52 for example, or wheels. It may also be manually driven.

In FIGS. 4 and 5d, the panel 10 is shown as comprising two half panels 10a and 10b hinged together, which can be fully deployed as shown in FIGS. 3a and 4a, or folded about the hinge one on top of the other as shown in FIG. 4b. In this embodiment, the working surfaces of the panel 10 can be protected even when the panel is in an extended position away from the wall 42. Moreover, such arrangement allows increased working surfaces in the operating position of the panel, and decreased overall dimension for withdrawal into a shelter, such as behind the wall 42 through the apertures 44 in the present embodiment.

Figure 6A:
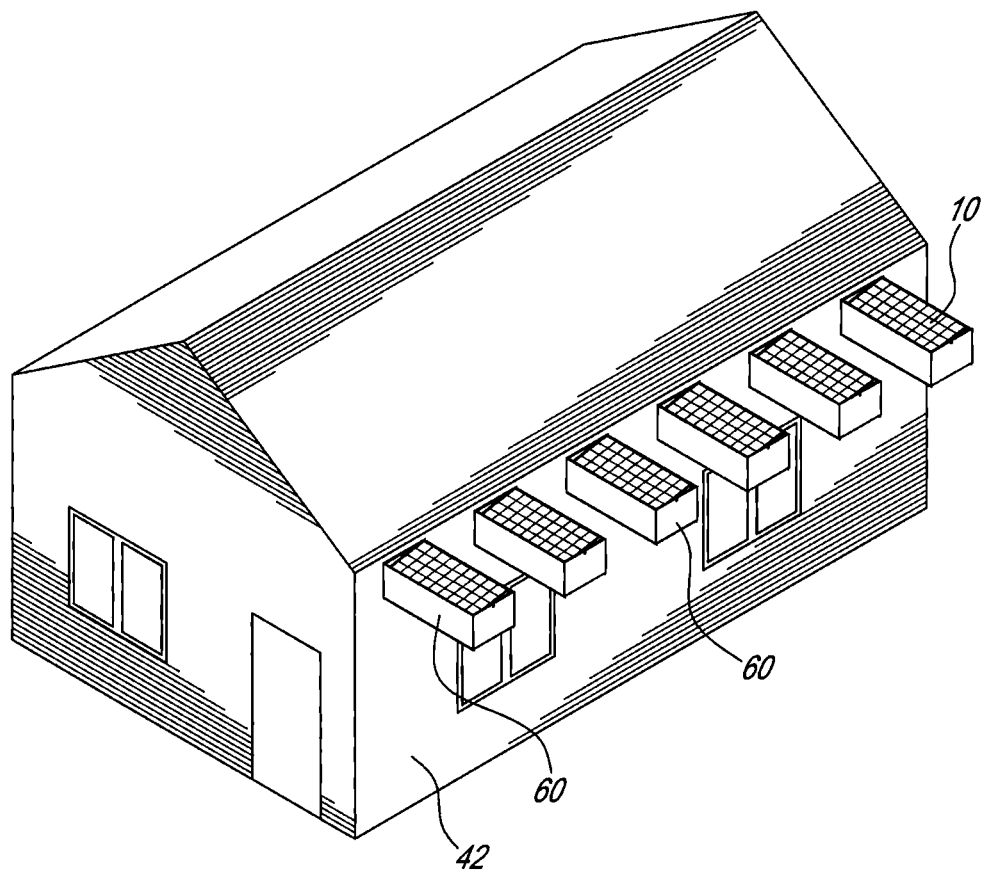
FIG. 6 show a further embodiment of the system of the present invention.
Figure 6B:
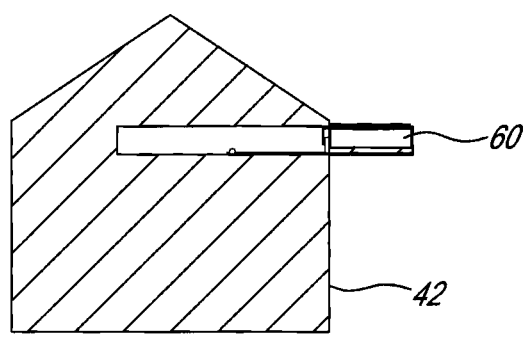

As shown in FIGS. 6a, 6b, the panels 10 may be supported in housings 60 than can be withdrawn, as drawers for example, behind the wall 42 of the building.

As illustrated in FIG. 7, the system can be applied to a vehicle, such as a RV, or a commercial truck or a passenger bus, or an individual car, for example. The system allows the panels to be stored inside the structure of the vehicle when the vehicle is moving (see FIG. 7a). Then, when the vehicle is at rest for example, the system allows extending out and orienting the panels for taking advantage of the energy of the sun (see FIGS. 7b, 7c), ready to be stored back in case the weather conditions deteriorate for example.

Figure 8C:
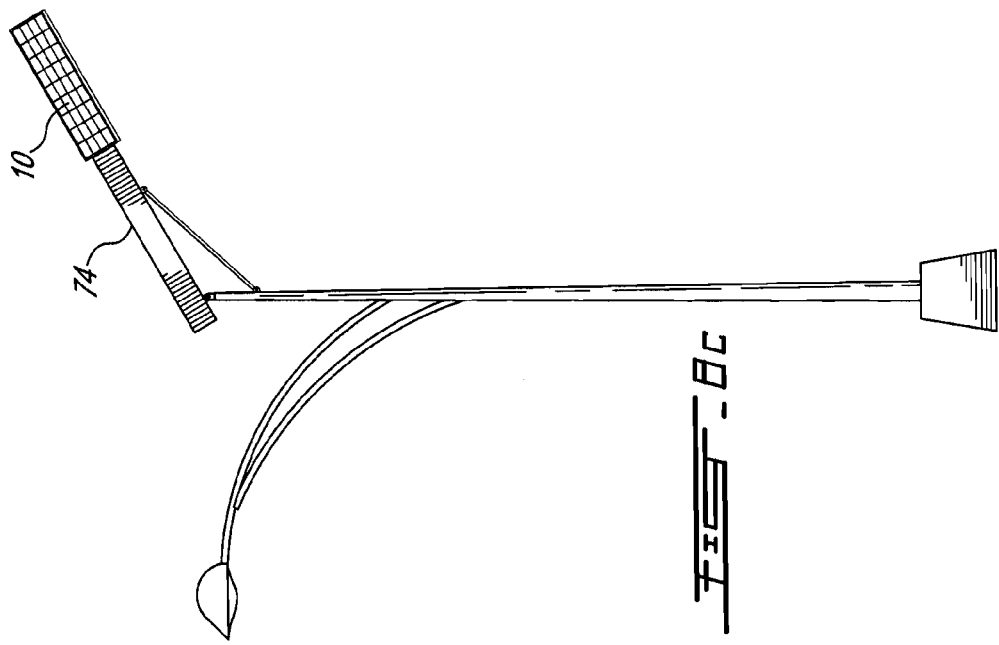
FIG. 8 show a further embodiment of the system of the present invention.
Figure 8B:
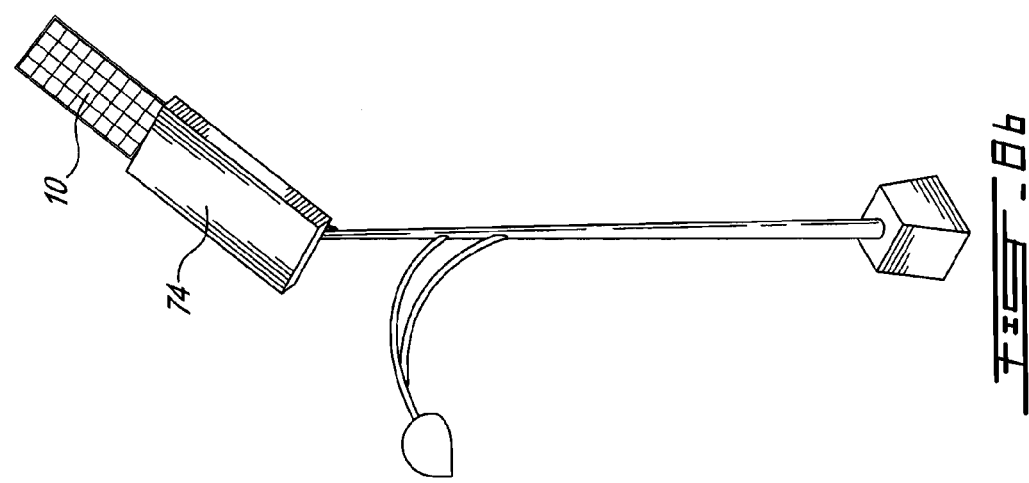
Figure 8A:
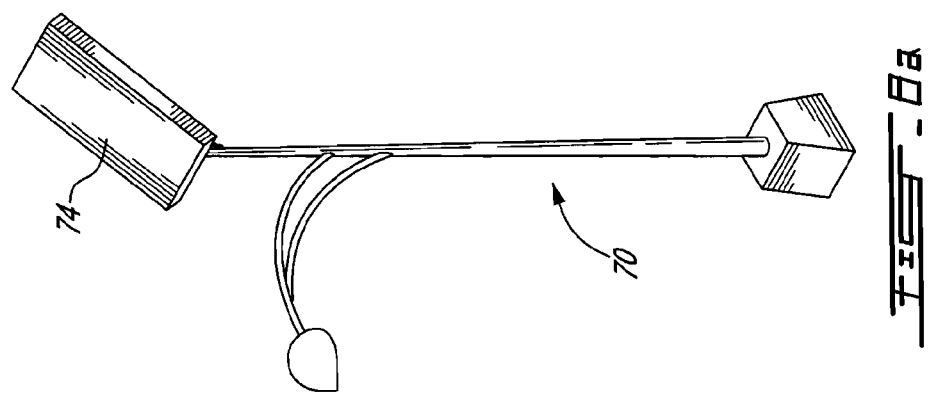

FIG. 8 show a streetlamp 70 supporting a housing 74 for storing a panel 10, which can be driven out from the housing 74 in a deployed operating position shown in FIGS. 8b and 8c, and oriented as described above for optimized use of the sun energy. As in all embodiments, the energy produced may be used on site, or the system may be provided with a battery to store the energy produced, or connected to the grid via an inverter, as is well known in the art.

Figure 10C:
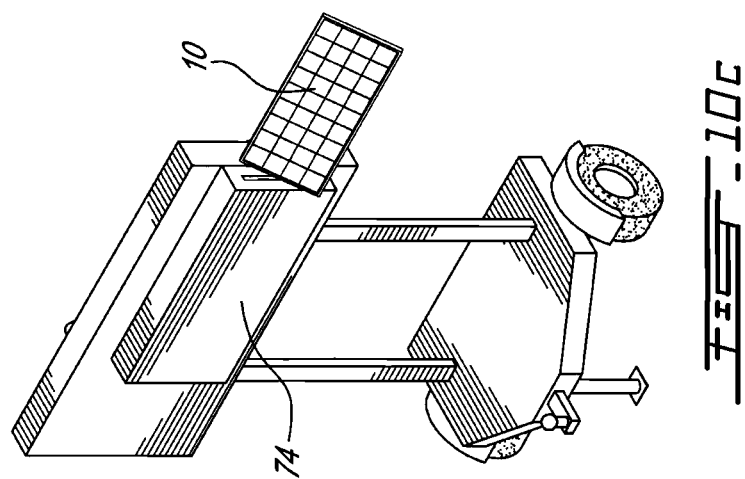
FIG. 10 show a further embodiment of the system of the present invention.
Figure 10B:
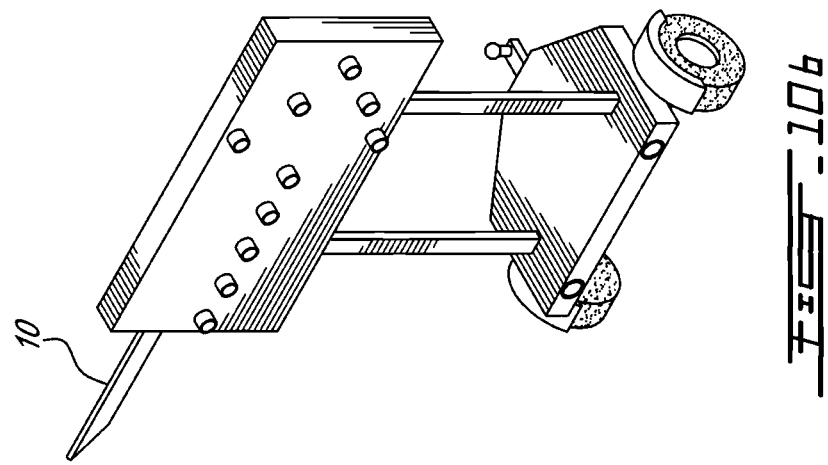
Figure 10A:
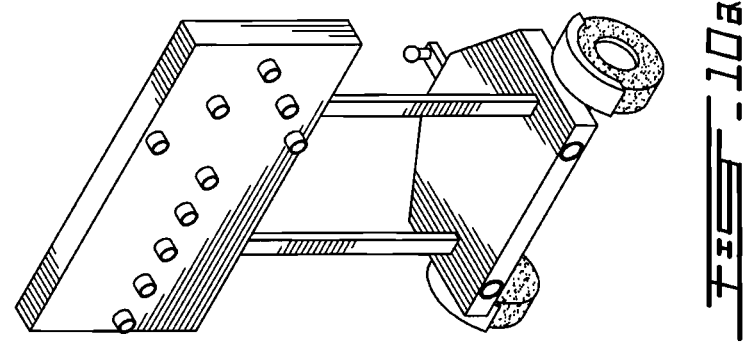

In FIGS. 9 and 10, an outdoor sign 80 comprises a housing 74 from which a panel 10 can be driven out as shown in FIGS. 9b, 10b, 10c and 10d.

FIG. 10f shows a housing 74 and FIG. 10e shows details of a panel 10 stored in the housing 74.

Figure 11B:
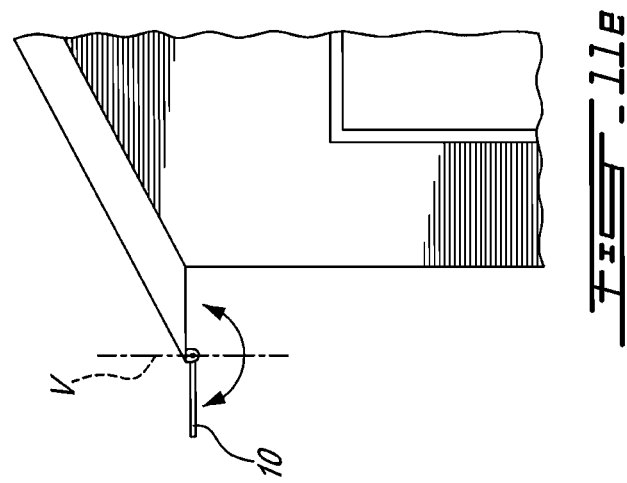
FIG. 11 show a further embodiment of the system of the present invention.
Figure 11D:
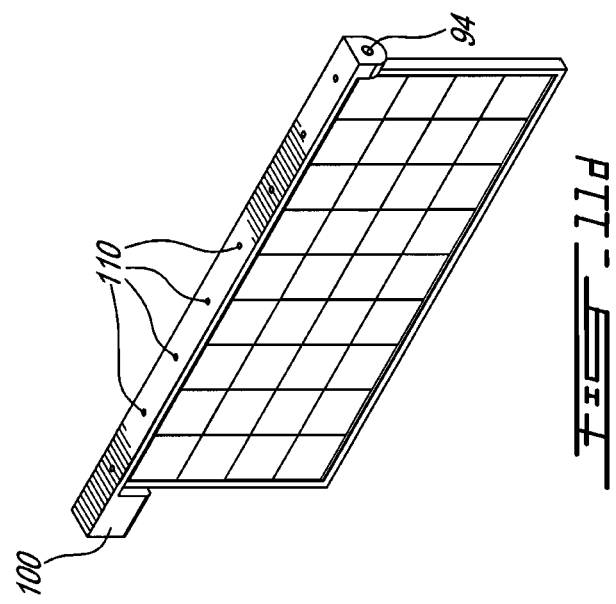

In FIG. 11, panels 10 are shown secured to the soffit 90 provided under a overhanging roof 92. Each panel 10 can be pivotally secured to a motorized shaft 94 fastened to the edge of the roof, as best seen in FIGS. 11b and 11c, unfolded away from the soffit 90 in an operating position 10a in FIG. 11b, or folded back under the soffit 90 in a rest position 10b shown in FIG. 11c. In between these two extreme positions, the solar panels 10 can be oriented according to the position of the sun. FIG. 11d shows details of the panel 10, with a motor and transmission unit 100 for activation of the rotation of the panel 10 about the shaft 94. In the operating position, the panel 10 can thus be oriented to follow the sun. Holes 110 may be provided for fastening under the soffit 90.

Alternatively, the panel could be pivoted about an axis vertical (V), as illustrated in FIG. 11e, to the soffit 90.

Clearly, the panel could be similarly protected by a number of downwards-facing surfaces of the building that are generally horizontal.

Figure 12B:
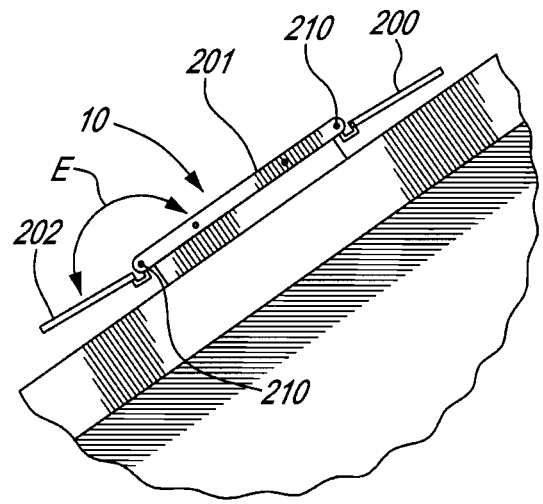
FIG. 12 show a further embodiment of the system of the present invention.
Figure 12C:
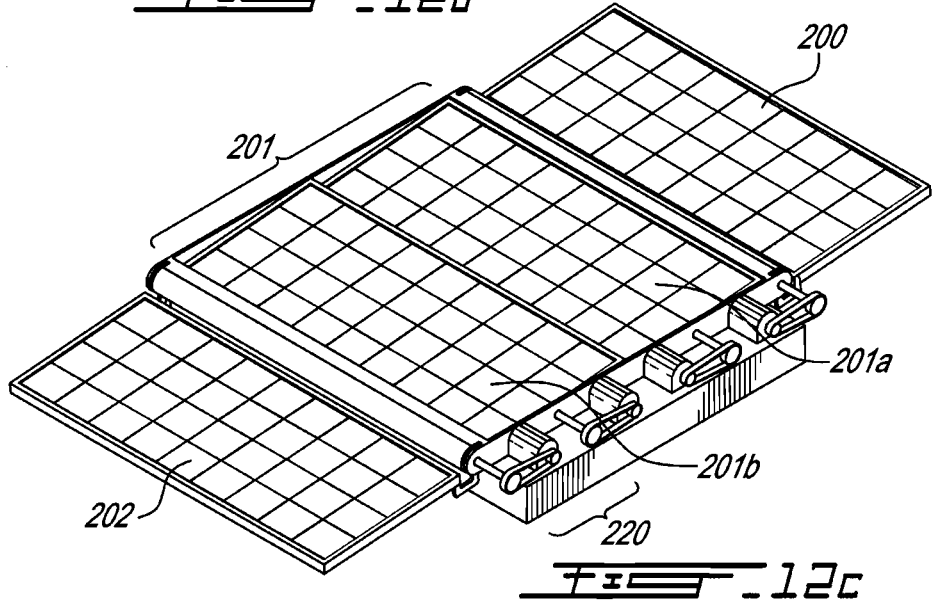
Figure 12D:
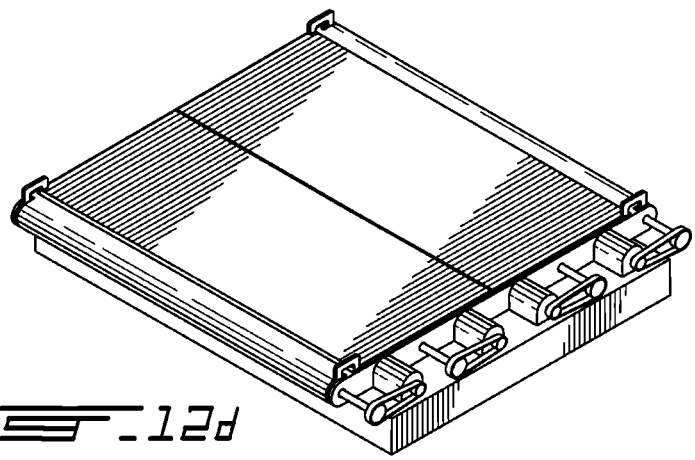

In an embodiment illustrated in FIG. 12, solar panels 10 are shown installed on the roof side of the house, in a fully extended position (FIGS. 12a-12c) and in a folded position (FIG. 12d). In this embodiment, lateral parts 200, 202 of the panel 10 can be folded back on a central part 201 thereof secured to the underneath surface, thereby shielding the operating surface of this central part 201 as well as their own respective operating surface. The central part 201 may be oriented in relation to the sun. For example, as shown in FIG. 12c, the central part 201 made of two halves, each being able to be oriented in relation to the sun. A motorised unit 220, including transmission, drive belt and transmission shaft 210, allows movement of the lateral parts 200, 202 (see arrow E FIG. 12b).

Figure 13A:
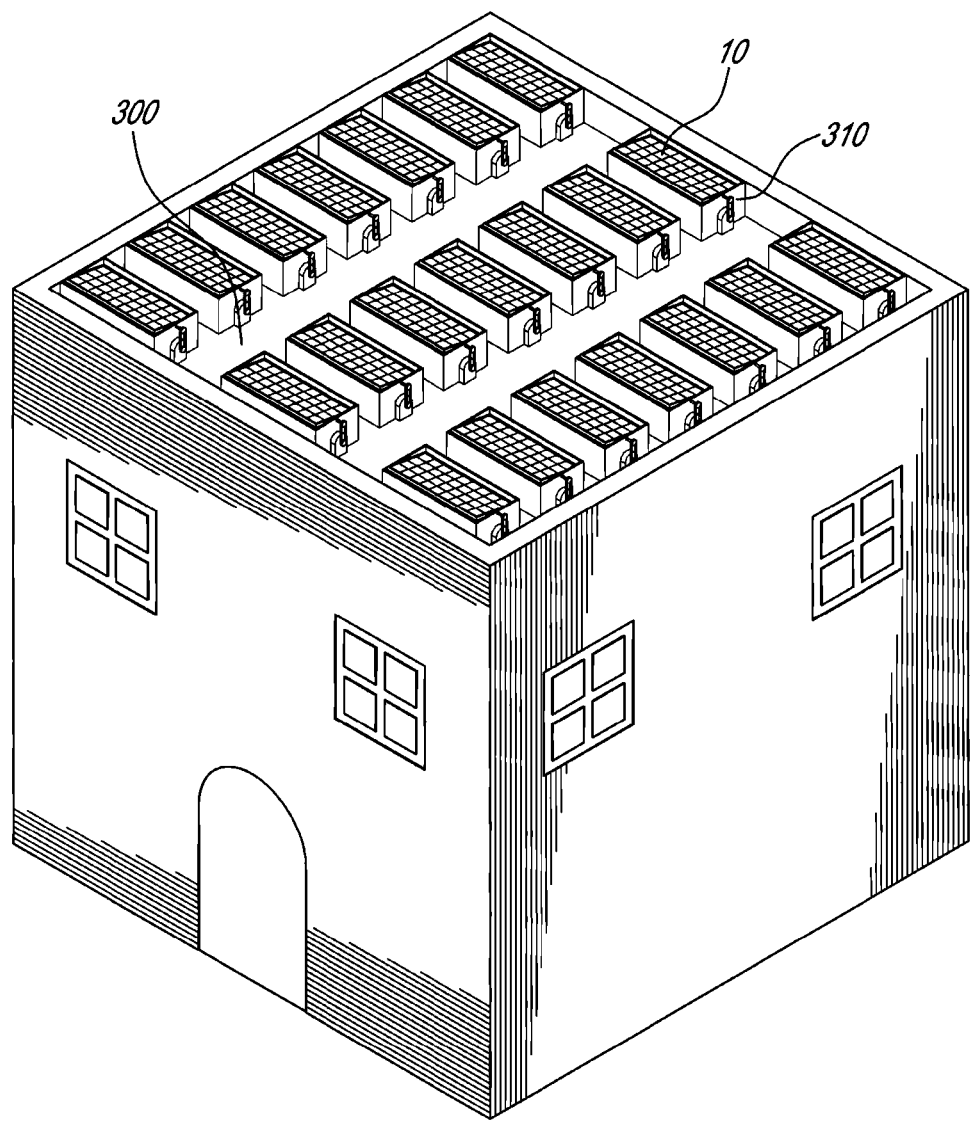
FIG. 13 show a further embodiment of the system of the present invention.
Figures 13B, 13C:
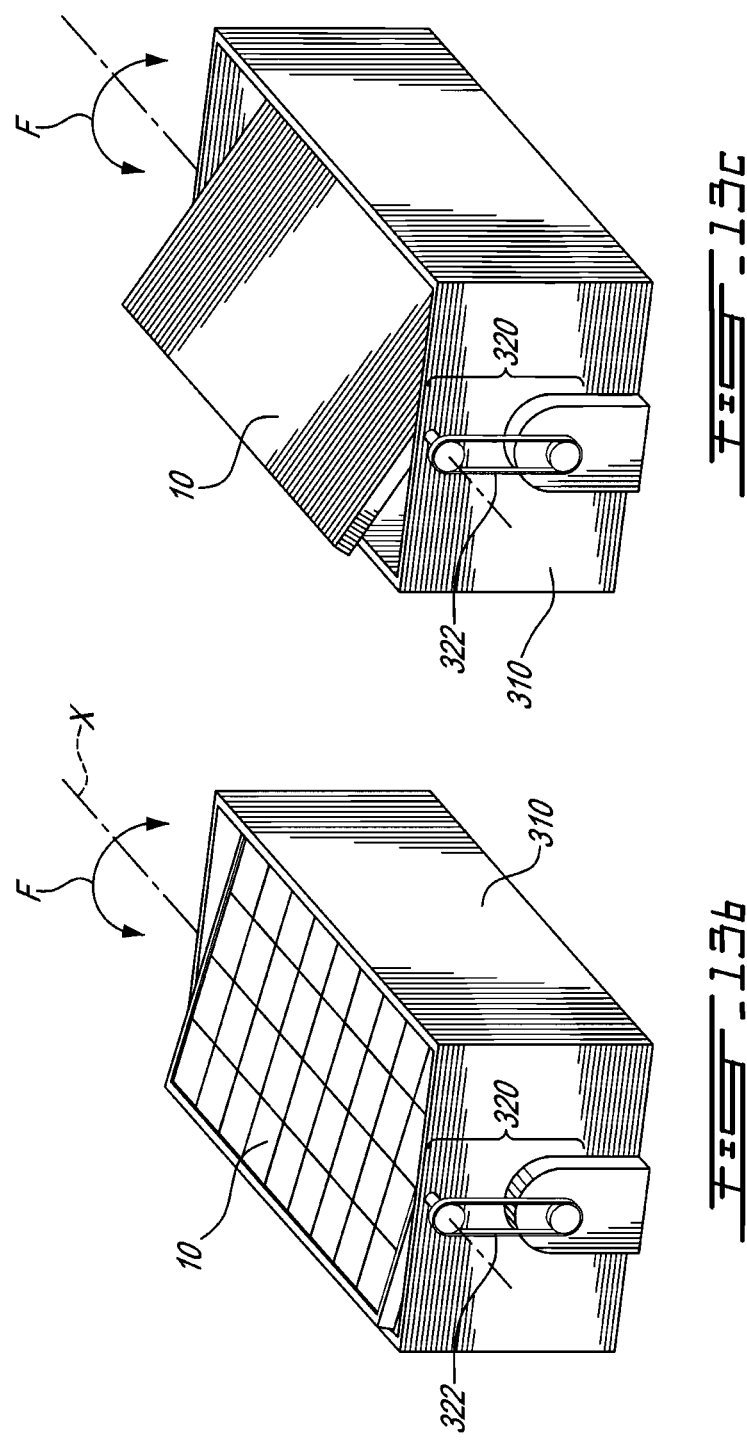

In FIG. 13, solar panels 10 are positioned on a roof top 300. A housing 310 is shown as supporting the panel 10, where the panel 10 is rotatable, via a pivoting system 320, between a face-up position illustrated in FIGS. 13a and 13b, where the working surface of the panel 10 is exposed upwards and thus operative in as may working positions as dictated by the position of sun, and a face-down position illustrated in FIG. 13c, in which the working surface of panel 10 is sheltered in the housing 310. Alternatively the housing itself may be rotatable with the panel fixed therein. Such panels can be used in arrays as shown in FIG. 13a. A drive belt 322 may be used to drive the panel 10 into rotation (see arrow F in FIGS. 13b and 13c) for an optimized working position according to the position of the sun and to tilt it from a working position to a full face-down position (FIG. 13c). Multiple panels can be stacked into housing 310.

Figure 13D:
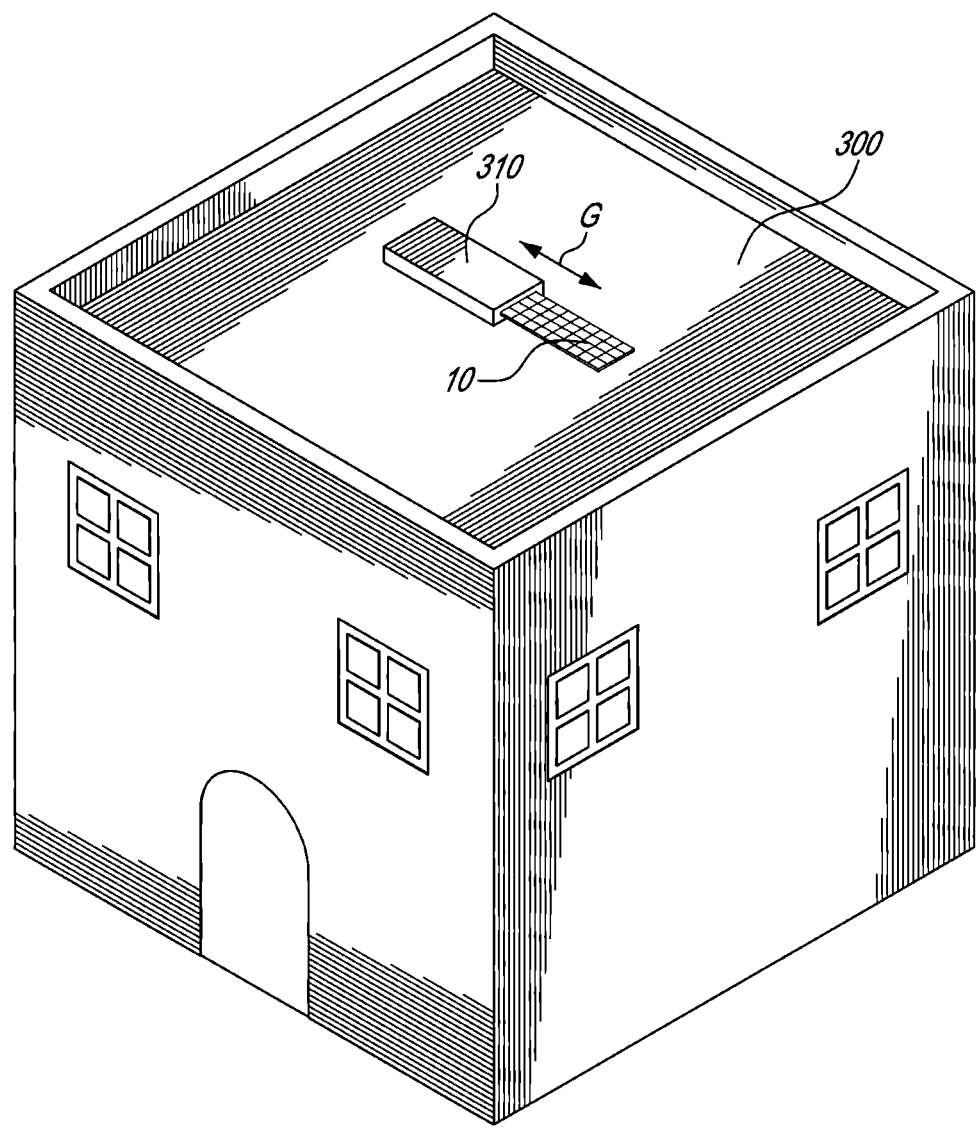

In FIG. 13d, the panel 10 is movable in translation in an out from a fixed housing 310, or the housing 310 is movable in translation in relation to the panel 10 to be able to cover it (see arrow G), the panel then being suspended on the surface of the roof with a pivoting system 320 as described above for example.

It may be contemplated providing such a sheltering housing, or any shelter 16 as shown in FIG. 1, anywhere on walls of the building, or even outside on the ground, on a patio, on a cemented surface etc. . . .

The housing 310 sheltering the panel may also be replaced by any other mean, including but not limited to: building walls, roof, shingle, etc.

Figure 14:
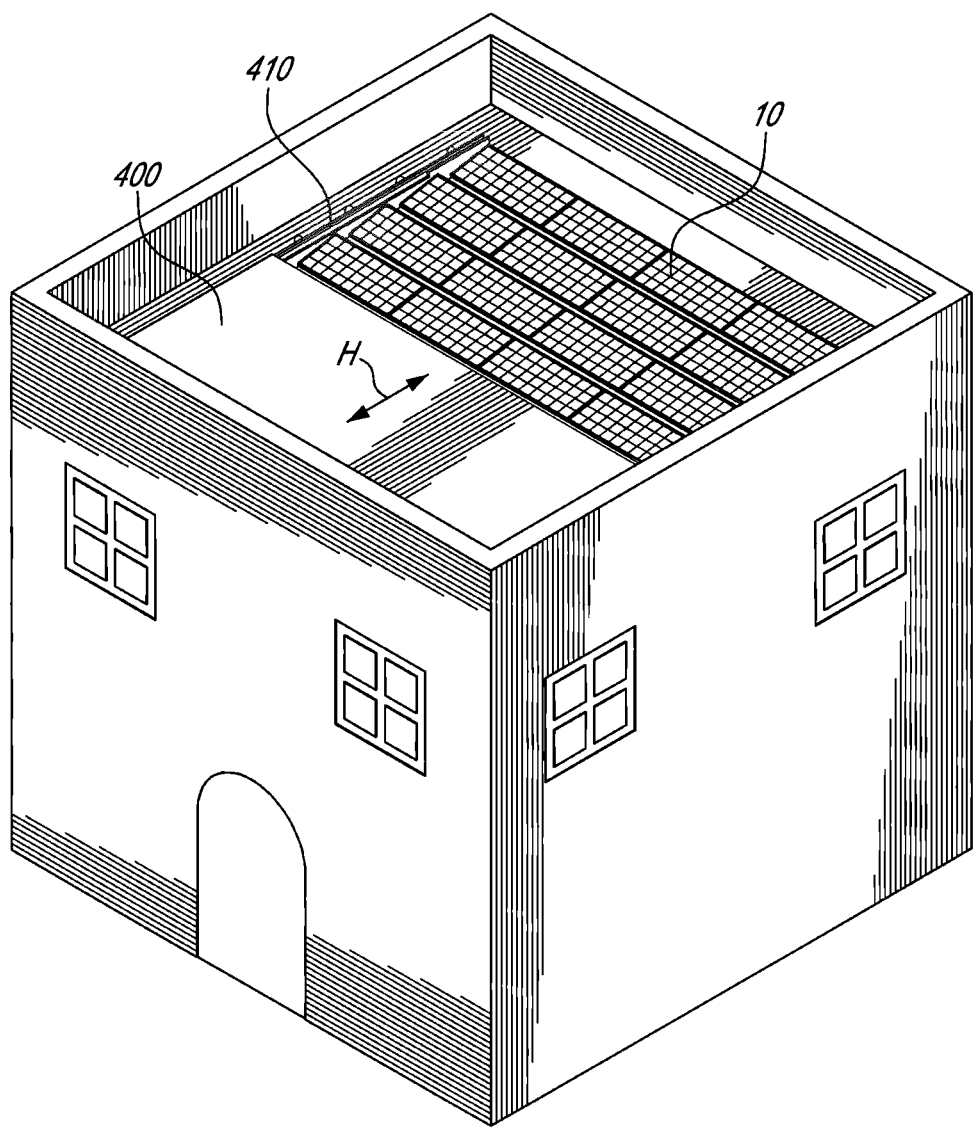
FIG. 14 show a further embodiment of the system of the present invention.

In FIG. 14 the panels 10 are fixed and can be protected by a cover 400 moving (see arrow H) on rails 410 or wheels or the like.

Figure 15B:
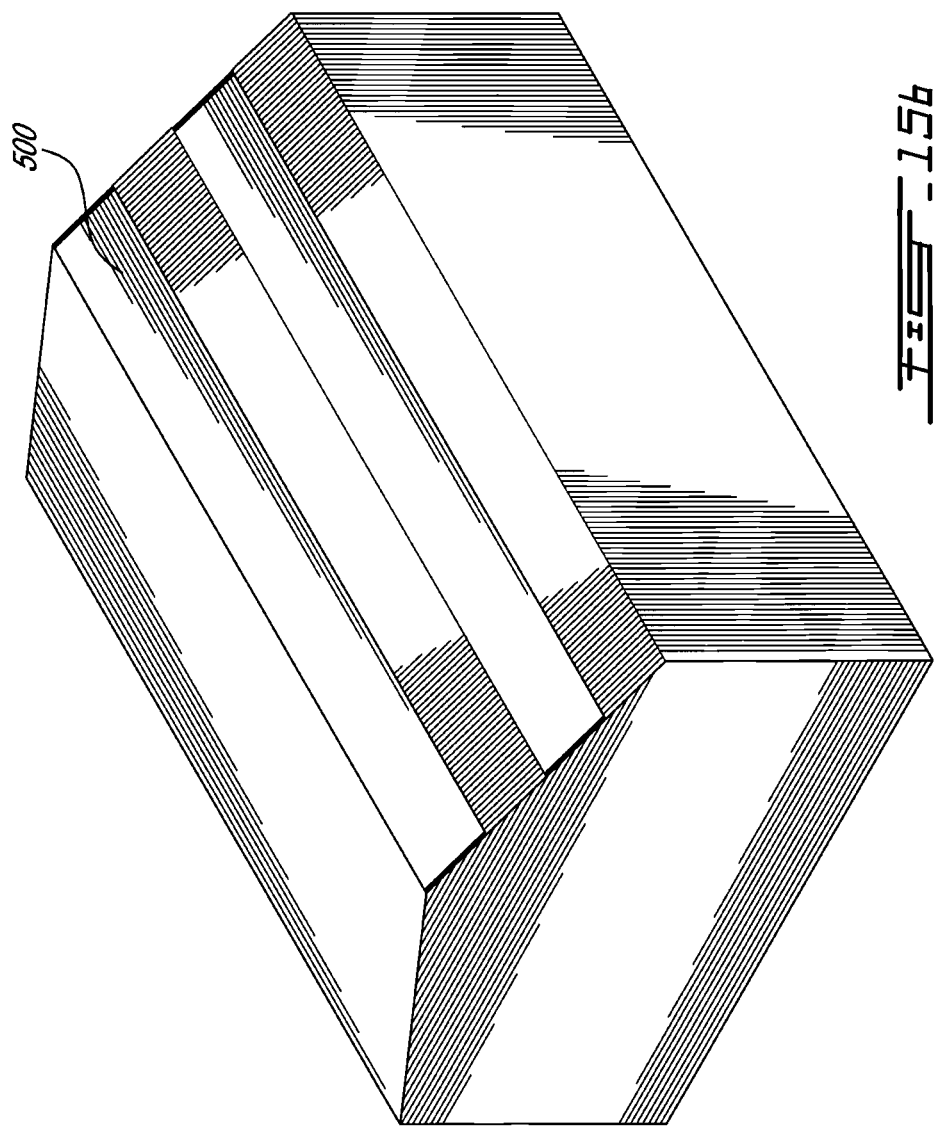
FIG. 15 show a further embodiment of the system of the present invention.

In FIG. 15, the panels are positioned as shingles (see FIG. 15a). In FIG. 15b, the panels 10 are shown covered by a moving cover 500. As best seen in FIG. 15c, a motorized unit and transmission unit 510 allow rotation of the panels 10 about an axis (see arrow L).

Figure 16A:
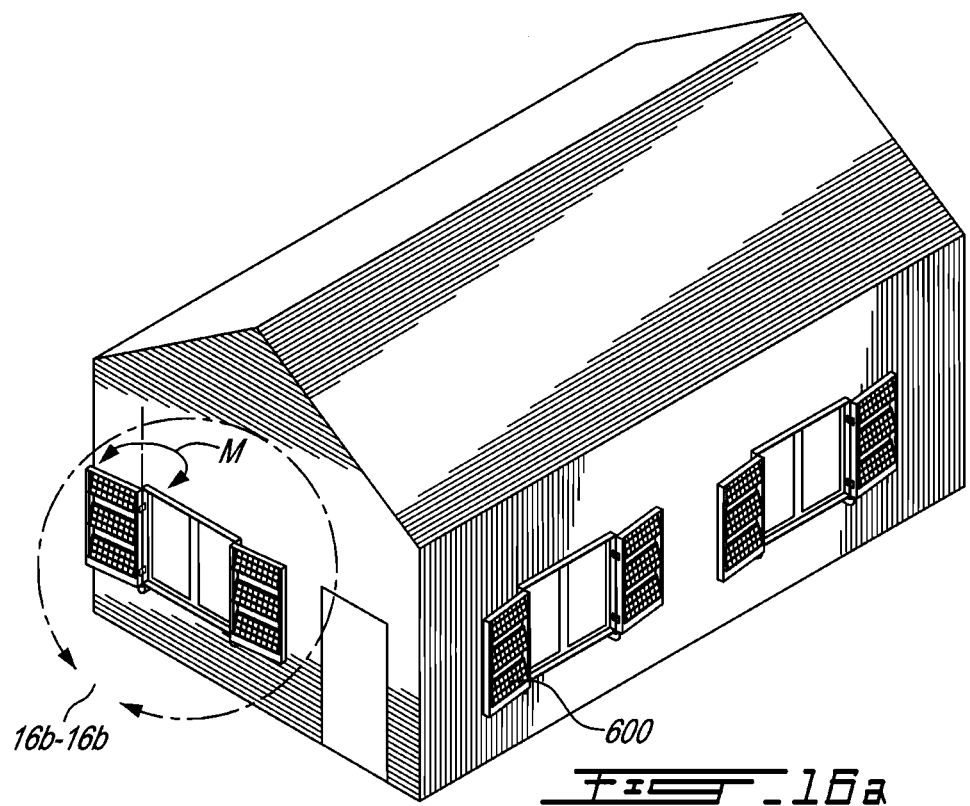
FIG. 16 show a further embodiment of the system of the present invention.
Figure 16B:
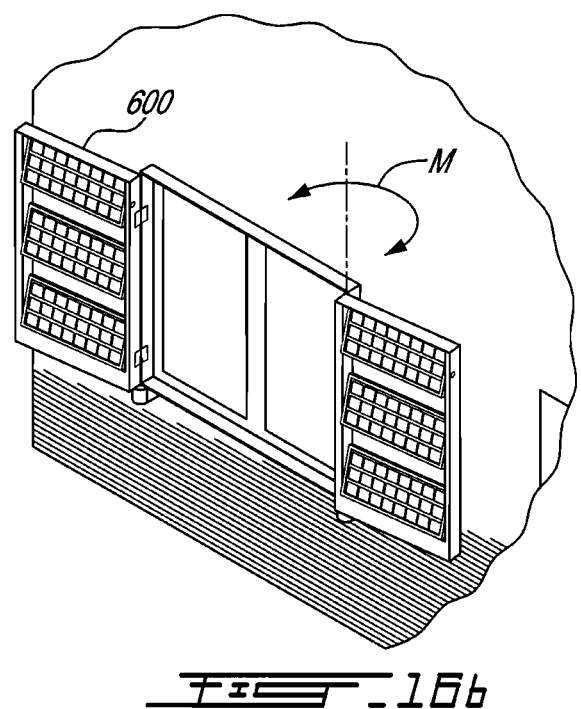

In FIG. 16, the panels 10 are secured to the inside surface of shutters 600 so that when the shutters 600 are opened, the panels 10 are in their working position, by rotation about the hinge of the shutters 600 (see arrow M). As shown in FIG. 16c, the panels 10 may further be rotated about axis 602, 604, 606 for a further orientation in their working position.

Figure 17A:
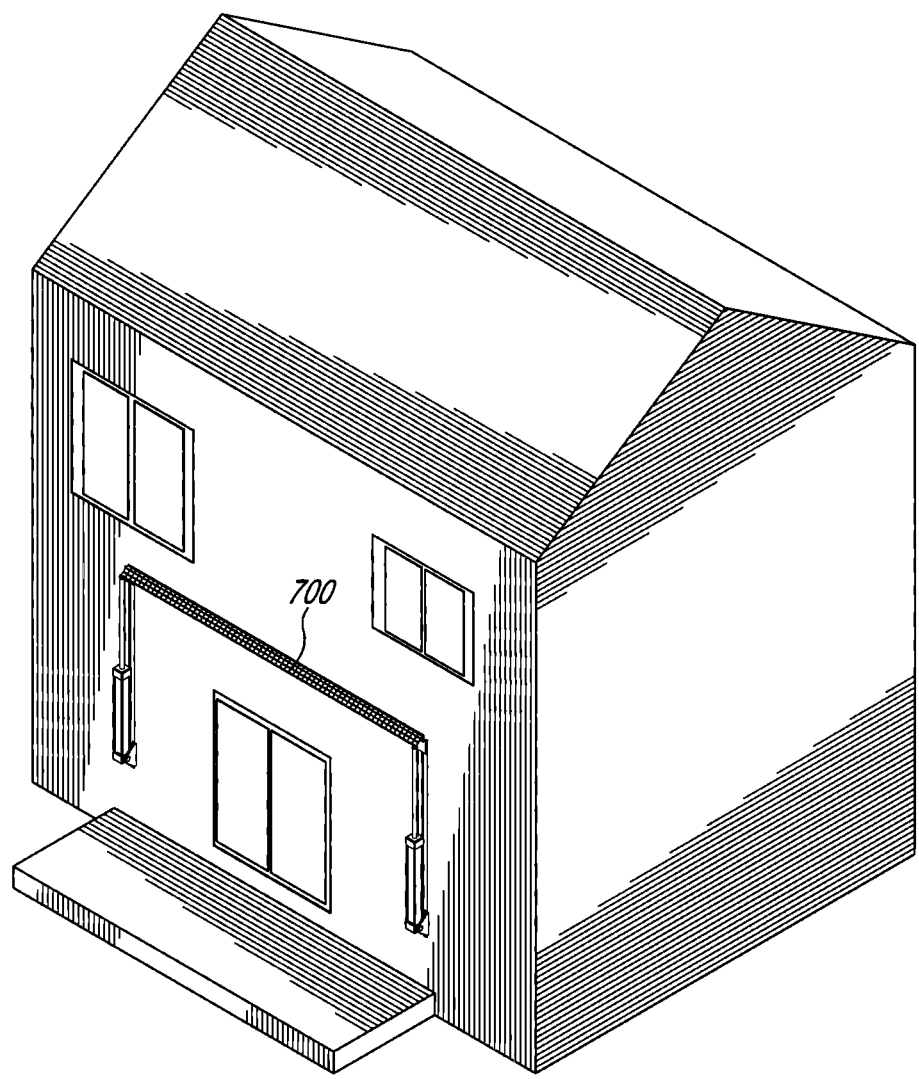
FIG. 17 show a further embodiment of the system of the present invention.
Figure 17B:
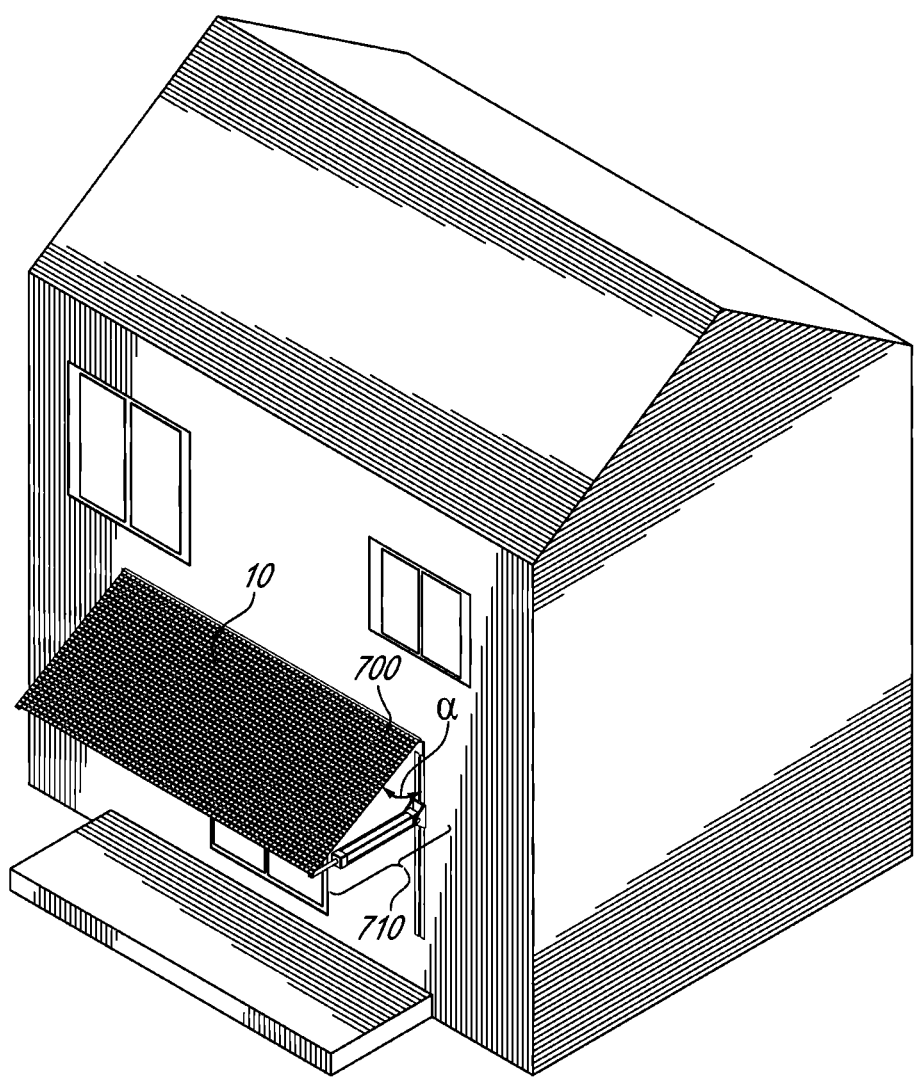

In FIG. 17, the panels 10 are secured to a awning 700, which can be stored against a wall in a folded position as shown in FIG. 17a and unfolded into a overhanging position as shown in FIG. 17b. As best seen in FIG. 17c, a motorized unit and a belt allow movement of the arm 720 along rails 730 for example (see arrow N). The vertical position of the arm 710 in turn controls the inclination α of the awning, i.e. of the panel 10. In this embodiment, flexible panels 10 are used, since they are supported by the awning 700 which is intended to be flexible into its folded position. Alternatively, the panels 10 may be used unsupported by an awing, on their own.

In all described embodiments, actuation of the withdrawal/unfolding of the door panel can either be done manually or automatically. An on/off switch button for example, may be provided for access to people in the house, for example, by which they can decide whether to put the panels of the house in the operating or in the protected position, according to the weather conditions for example.

Alternatively, the withdrawal/unfolding of the solar panels of the house may be monitored by a remote, or through a network, according to weather forecasts and alerts on the web or on cell phones for example, so that in case hail is expected, for example, all solar panels are retracted into a sheltered position. The system may be provided with batteries for self-powering, or connected to the power system of the building. The system may also be manually operated, using a crank for example.

It may also be contemplated connecting the solar panels to a barometer, a photo-cell, a wind sensor or a thermometer for example, and to program the withdrawal/unfolding of the solar panels according to pressure thresholds or luminosity thresholds respectively.

As people in the art may now be in a position to appreciate, the present system provides an efficient protection of solar panels in case it is needed, while allowing full operation thereof in non-adverse environmental conditions. Adverse conditions may include, for example, heavy rains, hail or sleet, frost, snow storm, dirt or sand storm, insects' and birds' clouds, and anything that can damage the solar panels, or impede their efficiency. Interestingly, the system may also protect the panel(s) from thieves.

Indeed, only very limited and light work is needed, since only apertures and accommodation of the system are needed, in a wall of a building or of a vehicle, or on a roof space, for example. Alternatively, the system only needs being fastened to the edge of the roof. Still alternatively, the system only needs being secured on the roof top.

In all cases, the system conforms to the features of the building in a non-bulky, non-intrusive, aesthetical and cost-effective way.

Although the present invention has been described hereinabove by way of embodiments thereof, it may be modified, without departing from the nature and teachings of the subject invention as described herein.

What is claimed is:

1. A system, comprising:
 a driving unit comprising a single shaft, said shaft supporting a solar panel at a free end thereof, said solar panel being mobile in translation along the direction of said shaft and in rotation about two axes; and
 a fixed shelter, receiving the solar panel when the solar panel is withdrawn from an exposed position, by action of the driving unit;
 a microcontroller, said microcontroller configured to control said driving unit;
 wherein said driving unit is configured for extending said panel by translation out of said shelter and for withdrawing said panel by translation within said shelter as instructed by said microcontroller, and, when said panel is out of said shelter, said driving unit is configured for operating said panel in rotation about at least one of the two axes according to signals as instructed by said microcontroller according to data received from at least one of a sun tracking unit, an external network, user interfaces and a weather station;

wherein said shaft is one of a hydraulic, a pneumatic, a mechanical and an electric shaft; and wherein said shelter is a recess in a wall of a building.

2. The system of claim 1, wherein said driving unit comprises rails supporting said shaft.

3. The system of claim 1, wherein said sun tracking unit comprises at least one of photoresistive cells, phototransistors and differential sensors.

4. The system of claim 1, further comprising sensors measuring the power of cells of the panel.

5. The system of claim 1, wherein said sun tracking unit comprises at least one of photoresistive cells, phototransistors and differential sensors, said system being configured for commanding-withdrawal of the panel by said driving unit into a non operating position under a threshold of power measured by said at least one of photoresistive cells, phototransistors and differential sensors.

6. The system of claim 1, further comprising a limit switch sending data about the position of said panel relative to the shelter.

7. The system of claim 1, connected to a weather station, said weather station comprising a set of sensors including at least one of barometers, photoresistive cells, phototransistors, and anenometers.

8. The system of claim 1, connected to an external network, said external network comprising one of: a phone network and a cable network.

9. The system of claim 1, connected to an alarm system.

10. The system of claim 1, wherein said panel is suspended in said shelter.

11. The system of claim 1, wherein said panel is flexible.

* * * * *